United States Patent [19]
Hasebe et al.

[11] Patent Number: 5,239,628
[45] Date of Patent: Aug. 24, 1993

[54] SYSTEM FOR ASYNCHRONOUSLY GENERATING DATA BLOCK PROCESSING START SIGNAL UPON THE OCCURRENCE OF PROCESSING END SIGNAL BLOCK START SIGNAL

[75] Inventors: Atsushi Hasebe; Atsushi Kikuchi, both of Kanagawa, Japan; Ryohei Kato, College Park, Md.; Norikazu Ito, Kanagawa, Japan

[73] Assignee: Sony Corporation, Tokyo, Japan

[21] Appl. No.: 395,189

[22] Filed: Aug. 18, 1989

Related U.S. Application Data

[63] Continuation of Ser. No. 929,916, Nov. 13, 1986, abandoned.

[30] Foreign Application Priority Data

Nov. 13, 1985 [JP] Japan ................... 60-254528
Nov. 19, 1985 [JP] Japan ................... 60-259539

[51] Int. Cl.$^5$ .................... G06F 15/16; G11C 8/00
[52] U.S. Cl. .................... 395/325; 364/920.7; 364/931.48; 364/931.41; 364/931.4; 364/DIG. 2
[58] Field of Search ... 364/200 MS File, 900 MS File

[56] References Cited

U.S. PATENT DOCUMENTS

| | | | |
|---|---|---|---|
| 3,673,576 | 6/1972 | Donaldson, Jr. | 364/200 |
| 4,024,510 | 5/1977 | Pearson | 340/172.5 |
| 4,244,019 | 1/1981 | Anderson et al. | 364/200 |
| 4,330,822 | 5/1982 | Dodson | 364/200 |
| 4,346,439 | 8/1982 | Huno et al. | 364/200 |
| 4,435,762 | 3/1984 | Milligan et al. | 364/200 |
| 4,442,505 | 4/1984 | Takano | 364/900 |
| 4,447,873 | 5/1984 | Price et al. | 364/200 |
| 4,454,595 | 6/1984 | Cage | 364/900 |
| 4,490,788 | 12/1984 | Rasmussen | 364/200 |
| 4,503,490 | 3/1985 | Thompson | 364/200 |
| 4,530,051 | 7/1985 | Johnson et al. | 364/200 |
| 4,574,351 | 3/1986 | Dang et al. | 364/200 |
| 4,591,973 | 5/1986 | Ferris, III et al. | 364/200 |
| 4,607,328 | 8/1986 | Furukawa et al. | 364/200 |
| 4,628,442 | 12/1986 | Isobe et al. | 364/200 |
| 4,644,463 | 2/1987 | Hotchkin et al. | 364/200 |
| 4,663,730 | 5/1987 | Ikeda | 364/900 |

FOREIGN PATENT DOCUMENTS

| | | |
|---|---|---|
| 0048350 | 8/1981 | European Pat. Off. |
| 0086605 | 2/1983 | European Pat. Off. |
| 0092646 | 2/1983 | European Pat. Off. |
| 0108284 | 10/1983 | European Pat. Off. |
| 0123322 | 4/1984 | European Pat. Off. |
| 0153439 | 5/1984 | European Pat. Off. |
| 0133359 | 7/1984 | European Pat. Off. |
| 0144924 | 11/1984 | European Pat. Off. |
| 0146250 | 11/1984 | European Pat. Off. |
| 014622250 | 11/1984 | European Pat. Off. |
| 0149516 | 1/1985 | European Pat. Off. |

(List continued on next page.)

OTHER PUBLICATIONS

"IEEE Transactions on Pattern Analysis and Machine Intelligence" PAMI-7, No. 2, Mar. 1985, pp. 216-228 (Miller et al.).
"IEEE Transactions on Computers" vol. C-31, No. 3, Mar. 1982, pp. 208-218 (Siegel et al.).

Primary Examiner—Thomas C. Lee
Assistant Examiner—L. Donaghue
Attorney, Agent, or Firm—Lewis H. Eslinger; Jay H. Maioli

[57] ABSTRACT

An information processing system including an input/output section, a memory section, and a data processing section for communicating data via the memory section in block units between the input/output section and the data processing section to effect a processing characterized in that a signal indicating an end of the processing in block units is supplied from the data processing section to the input/output section and that a processing start timing signal formed depending on the signal indicating the processing end delivered from the output section is delivered to the data processing section, the processing start timing signal being synchronized with a data block period.

5 Claims, 15 Drawing Sheets

FOREIGN PATENT DOCUMENTS

| | | |
|---|---|---|
| 0150516 | 1/1985 | European Pat. Off. . |
| 0159461 | 1/1985 | European Pat. Off. . |
| 0154586 | 2/1985 | European Pat. Off. . |
| 0150910 | 4/1985 | European Pat. Off. . |
| 0169590 | 6/1985 | European Pat. Off. . |
| 0174231 | 7/1985 | European Pat. Off. . |
| 0182492 | 10/1985 | European Pat. Off. . |
| 1166058 | 10/1969 | United Kingdom . |
| 1269321 | 4/1972 | United Kingdom . |
| 1372236 | 10/1974 | United Kingdom . |
| 1519169 | 7/1978 | United Kingdom . |
| 2017987 | 3/1979 | United Kingdom . |
| 2052813 | 5/1980 | United Kingdom . |
| 2119594 | 3/1983 | United Kingdom . |
| 2137383 | 10/1984 | United Kingdom . |
| 2138182 | 10/1984 | United Kingdom . |
| 2156550 | 10/1985 | United Kingdom . |
| 2157860 | 10/1985 | United Kingdom . |
| 2158321 | 11/1985 | United Kingdom . |
| 2161666 | 1/1986 | United Kingdom . |
| 2174860 | 11/1986 | United Kingdom . |
| 2177826 | 1/1987 | United Kingdom . |
| 2177871 | 1/1987 | United Kingdom . |
| 2178197 | 2/1987 | United Kingdom . |
| 2180378 | 3/1987 | United Kingdom . |
| 2180968 | 4/1987 | United Kingdom . |

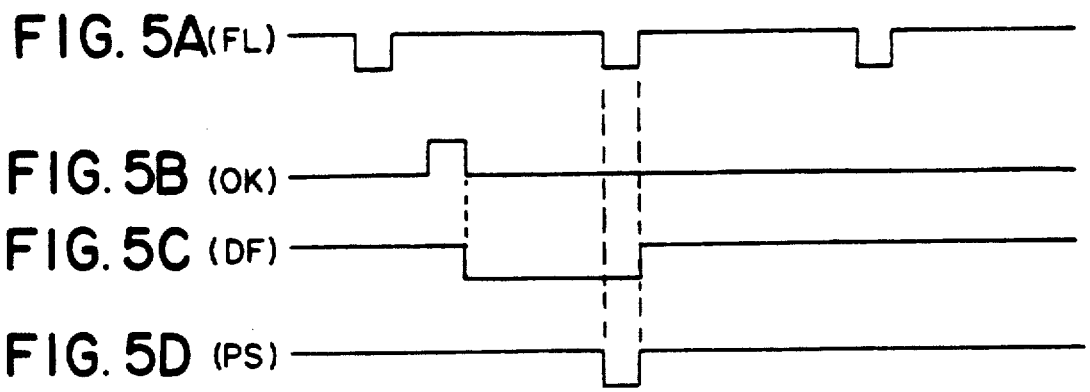
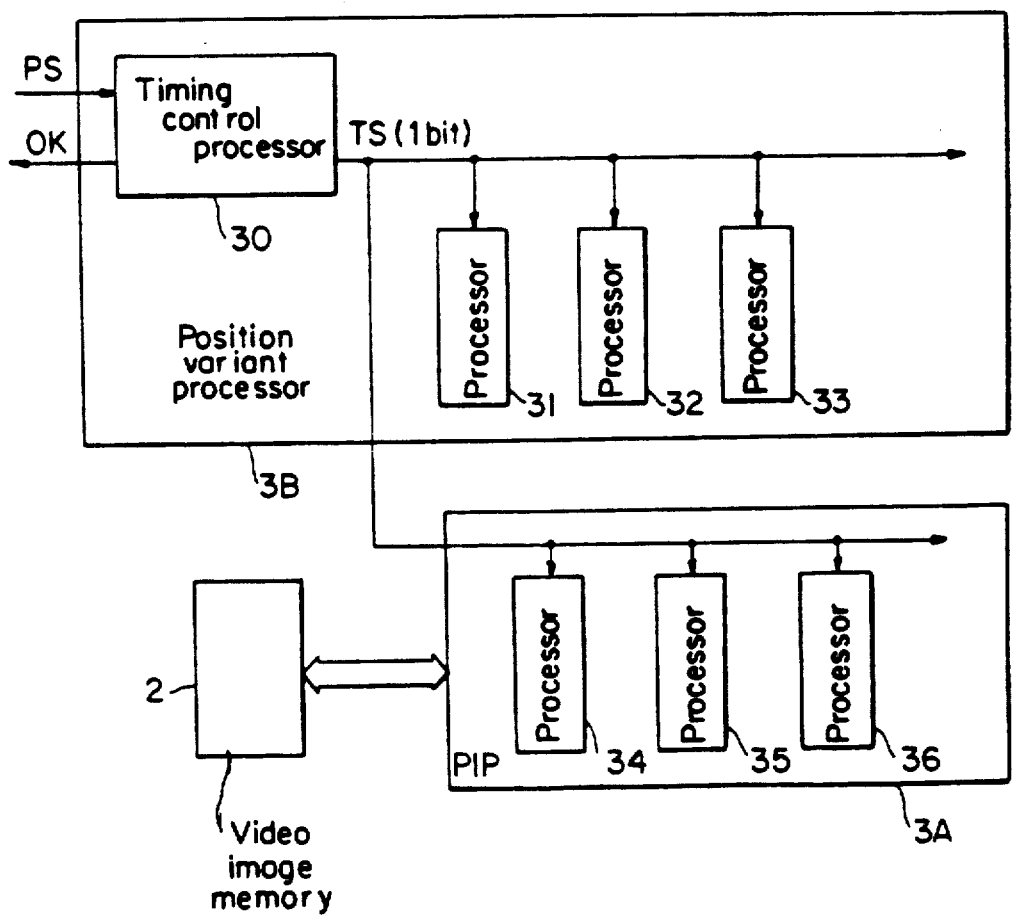

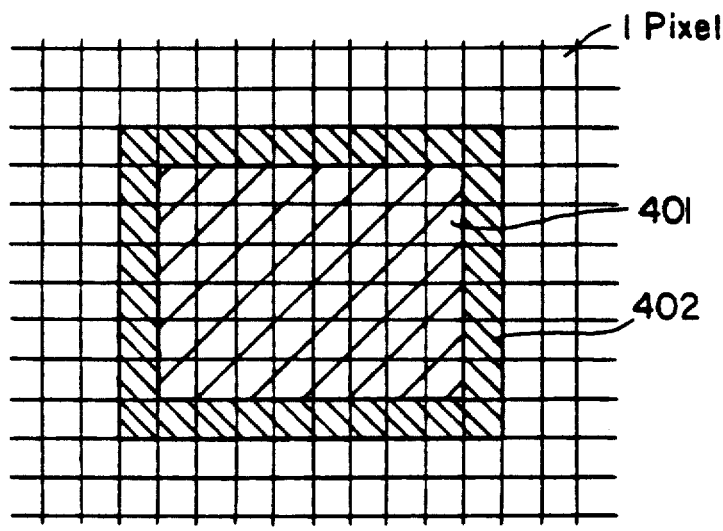
FIG. 19
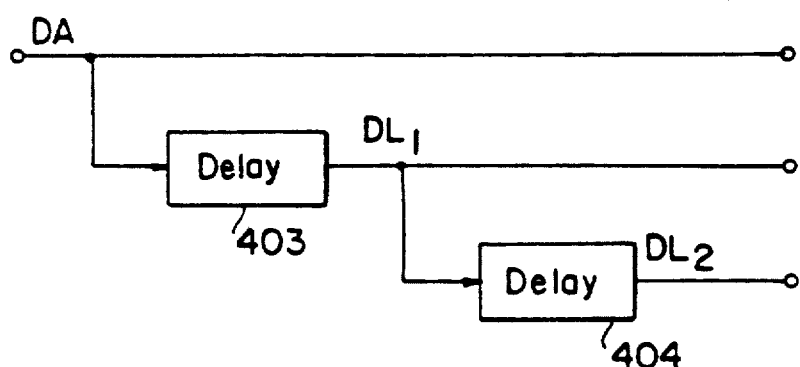
FIG. 20
FIG. 21

| Address | Memory (2A) | Memory (2B) |
|---|---|---|
| 0 | $a_{11}$ | $a_{13}$ |
| 1 | $a_{21}$ | $a_{23}$ |
| 2 | $a_{31}$ | $a_{33}$ |
| 3 | $a_{12}$ | $a_{32}$ |
| 4 | $a_{22}$ | — |

SYSTEM FOR ASYNCHRONOUSLY GENERATING DATA BLOCK PROCESSING START SIGNAL UPON THE OCCURRENCE OF PROCESSING END SIGNAL BLOCK START SIGNAL

This is a continuation of application Ser. No. 06/929,916, filed Nov. 13, 1986.

BACKGROUND OF THE INVENTION

The present invention relates to a data processor.

Conventionaly, there has been proposed an information processing system, for example, a video image processing system (Journal of the Institute of Electronics and Communication Engineers of Japan, 85/4, Vol. J68-D, No. 4).

As an example of such a system, an image processing system has been proposed which includes a processor for processing image data and a processor for processing an address of the image data (JP-A-58-215813).

To implement a high-speed image processing system, a high operation speed is required for the arithmetic operation having an operation configuration unique to the image processing; moreover, the access and the transfer of a great amount of data arranged in a 2-dimensional structure must be accomplished at a high speed.

For the implementation of the high-speed operation, there have been proposed a parallel system and a pipeline system.

In the parallel system, many processor elements are operated in a parallel fashion to achieve a high-speed processing.

Although this system has a possibility of a very high speed operation, a great load is imposed on the software controlling the processing, which leads to a problem that the potential capability of the hardware cannot be sufficiently utilized.

On the other hand, the pipeline system has a simple hardware structure and a simple processing control, and hence a high-speed operation can be relatively easily accomplished. However, since the processing speed is substantially proportional to the switching speed of the transistor, the very high speed operation is limited. The processing is also restricted by the pipeline structure, which leads to a problem that the flexibility of the system is reduced. The speed of the data transfer in the parallel system is determined by the method of combining the processor elements and the memory. The combining method is classified into a shared memory type and a network type. Since the image processing handles a great amount of data, the combining method of shared memory type is adopted in many systems. In the pipeline system, the processing and the transfer is mixed, and hence the speed of each stage of the pipeline must be increased.

The high-speed image processing system enables various image processing and the contents of the image processing include not only a simple linear processing but also nonlinear processing such as a conditional branch processing; consequently, the flexible system is required.

However, this system is not sufficient to organically combine a plurality of processors so as to achieve a high-speed processing and a complex, calculation.

SUMMARY OF THE INVENTION

It is therefore an object of the present invention to provide a data processor in which a plurality of processors are organically combined to effect a high-speed processing and a complicated computation.

BRIEF DESCRIPTION OF THE DRAWINGS:

The present invention will be apparent from the following detailed description taken in conjunction with the accompanying drawings in which:

FIG. 5A, 5B, 5C, 5D are a timing flowchart for explaining FIG. 4;

FIG. 6 is a block diagram depicting an embodiment of circuits of the data processor of FIG. 1;

FIGS. 19-20 are diagrams for explaining a contour extract processing as an example in which a neighborhood processing is achieved in the image processing system of FIG. 1;

FIG. 21 is a block diagram depicting an embodiment of an input circuit of each processor for executing the neighborhood processing shown in FIGS. 19-20;

DESCRIPTION OF THE PREFERRED EMBODIMENTS:

Referring now to the accompanying drawings, a description will be given of an embodiment in which the present invention is applied to a video image processing system.

Figure 1:
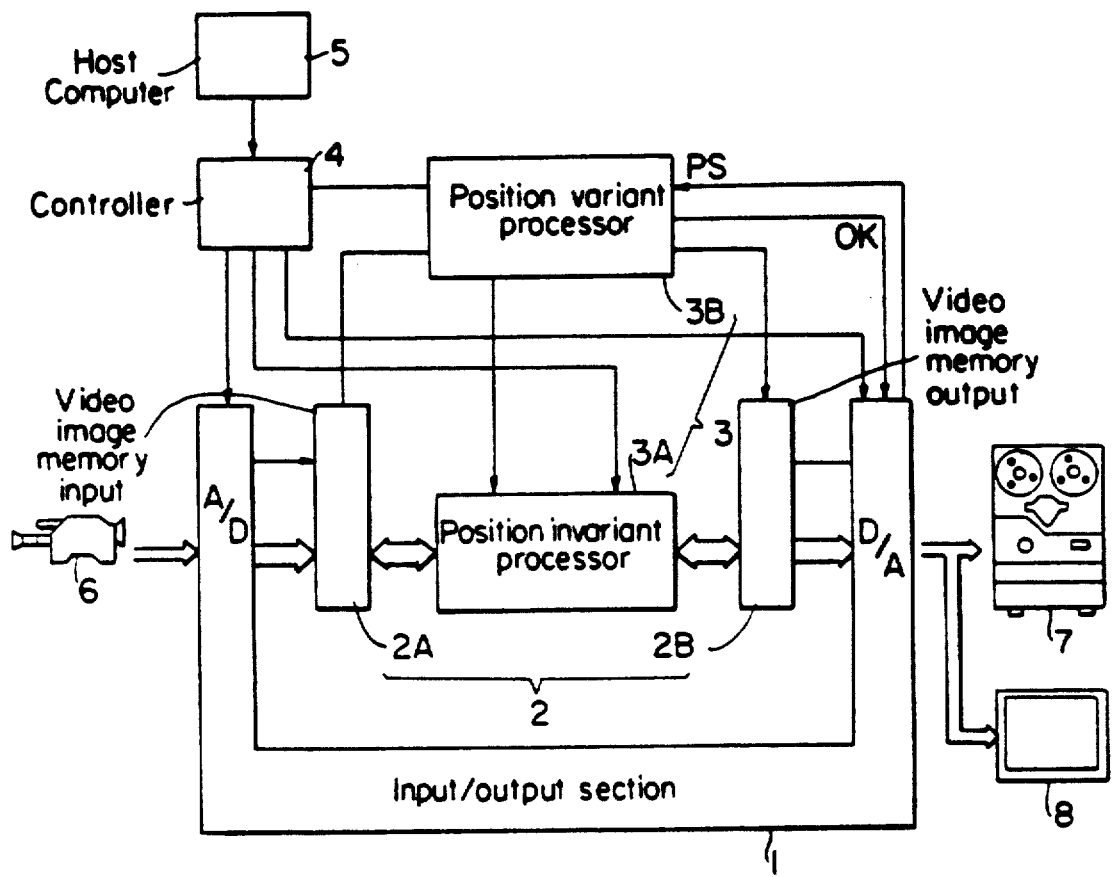
FIG. 1 is a schematic block diagram illustrating the entire configuration of an image processing system to which an embodiment of the data processor according to the present invention is applied.

An example of the video image processing system of FIG. 1 aims at a higher-speed data processing and comprises an input/output section 1 (IOC), a memory section 2 (VIM) including an input image memory 2A (VIMIN) and an output image memory 2B (VIMOUT), a data processing section including a position invariant processor 3A (PIP) for mainly calculating a pixel value and a position variant processor 3B (PVP) for accomplishing data flow control such as the address control and for effecting the timing control, and a processor 4 (TC) as a controller of the overall system for controlling the execution of processing, termination of processing, and program exchange To the TC 4, a host computer 5 (HC) is connected to control the overall video image processing system.

The IOC 1 is configured such that, for example, a video signal from a video camera 6 or a VTR is subjected to an A/D conversion to obtain a digital image data, which is then written in the VIMIN 2A; furthermore, a processed image data is read from the VIMOUT 2B and is restored into an analog video signal through a D/A conversion, which is then recorded, for example, in a VTR 7 or is supplied to a monitor image receiver 8, thereby enabling a video image to be monitored.

In addition, other than the digital data, signals for externally controlling the VIM 2 such as a clock, a dominant mode signal, an address, and a write control signal are supplied from the IOC 1.

In this case, the signals which can be inputted to or outputted from the IOC 1 are signals of the NTSC system or the R/G/B system. The signal system is specified through the TC 4. Moreover, a pixel is a data item comprising eight bits, for example.

A read or write operation of the VIM 2 is achieved in a group of an image, namely, a field or frame unit. To this end, the VIMIN 2A and VIMOUT 2B each include a plurality of memory sheets each having a capacity of a field or frame of image data. For example, 12 sheets of 768×512 byte frame memory are provided. In this case, the utilization of these 12 sheets of frame memory is not fixed, namely, the 12 sheets can be arbitrarily allocated as the VIMIN 2A or the VIMOUT 2B according to the processing purpose or the processing objective image. Moreover, the memory sheets are designed to be used in a pair and when a sheet of a pair is in the write state, the other sheet can be used for a read operation, which enables the IOC 1 to achieve parallel processing of an external processing through the VIM 2 and the internal processing through the VIM 2 by use of the PIP 3A and the PVP 3B.

In this case, the dominant mode signal to determine whether the sheets of frame memory of the VIM 2 are under control of the IOC 1 or the PVP 3B is generated from the IOC 1 and is supplied to the VIM 2.

Moreover, the address of digital data to be processed, the write control signal, the read mode signal, and data select signal for internally controlling the VIM 2 are supplied from the PVP 3B to the VIM 2, and then the data stored at the address is transferred to the PIP 3A for the processing thereof.

Furthermore, the data processed in the PIP 3A is supplied to the VIM system 2, and then an address and other information are supplied from the PVP 3B to the VIM 2. As a result, the digital data thus processed is written in the VIM 2.

Moreover, an address and other information are also supplied from the VIM 2 to the IOC 1, which causes the digital data read as a result to be supplied to the IOC 1, and then the digital data is converted into a predetermined analog video signal through a DA conversion and other processing so as to be fed to an output terminal.

The data processing section 3 has a processor and reads the image data stored in the VIMIN 2A according to a program of the processor and executes various kinds of data work processing thereon, and then the processed data is written in the output image memory 2B.

The data processing section 3 is subdivided into the PIP 3A and the PVP 3B; consequently, as compared with the conventional data processing section requiring the processing time equal to the total of the processing time of these subsections, the data processing section 3 requires only the larger processing time thereof because of provisions of these subsections. Consequently, the case of this example realizes a high-speed speed processing which almost allows the video data processing to be executed through a realtime processing.

The processor of the data processing section 3 includes one sheet of processor or several sheets of processors, and the microprogram contained in the microprogram memory thereof can be changed if it is required to expand the processing capability.

The microprogram is temporarily supplied from the HC 5 to the TC 4 so as to be stored in an RAM disposed therein; and thereafter, for example, in response to a program change, request from the user (by setting the pertinent switch to ON), the microprogram is supplied from the TC 4 to each processor, thereby changing the microprogram.

The PIP 3A and the PVP 3B each are of the same architecture and are independent processors each including a control section, an arithmetic section, a memory section, and an input/output port. These systems are respectively structured in a multiprocessor configuration comprising a plurality of unit processors in which a high-speed processing is mainly implemented according to the parallel processing scheme.

The PIP 3A has, for example, 60 sheets of PIP processors and several sheets of subprocessors, so that the working of the image data from the VIM 2 is accomplished or the image data is generated in the PIP 3A.

The PVP 3B includes, for example, 30 sheets of processors to control the flow of the internal image data with respect to the VIM 2, for example, to effect allocation and recovery of the image data obtained from the VIM 2 on the PIP 3A.

That is, the PVP 3B generates an address data and a control signal to the VIM 2 and supplies them to the VIM 2; and the PVP 3B generates the input/output control signal of the PIP 3A and other control signals and supplies them to the PIP 3A.

As for the image data processing, there is not only the case where the data from a frame of the input image memory 2A is processed and the processed data is written in the output image memory 2B but also a case where the data stored in a plurality of frames from a plurality of sheets of frame memory is processed.

In addition, the number of bits to be processed in the PIP 3A and the PVP 3B is 16 in the standard specification, and for the arithmetic processing of the image data processing, it is enabled to implement a processing speed at which the processing can be implemented within a frame, namely, the realtime processing can be achieved for the 1-frame image data. There exist naturally a processing which requires a processing time exceeding a frame.

In this case, the image data processing of the PIP 3A and the PVP 3B is accomplished in synchronism with the frame. Consequently, the PVP 3B is supplied from the IOC 1 with a processing start timing signal PS synchronized with the frame. The PS signal is normally at a high level and is set to a low level when the processing start timing is detected. On the other hand, the PVP 3B supplies the IOC 1 with a signal OK indicating that a processing has been completed. This signal OK is outputted from the primary processor among the processors of the PVP 3B when the processing is completed. The primary processor is the processor controlling the timing of the processing system.

Figure 2:
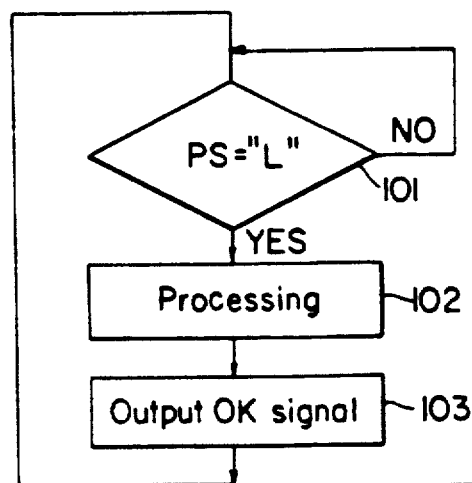
FIG. 2 is a flowchart depicting the operation of circuits in the data processor of FIG. 1.

That is, in a step 101 of the program flowchart of FIG. 2 as an example of means to output a signal OK from the processor, the primary processor of the PVP 3B softwarewise detects a fact that the processing start timing signal PS from the IOC 1 is set to the low level. When the condition that the signal PS is set to the low level is detected, the processor starts its operation and outputs a timing signal TS by use of a program to the other processors including the PIP 3A, and then supplies an address to the VIM 2, reads an image data from the VIM 2, and performs a work processing in the PIP 3A (step 102). When the processing is finished, the signal OK is outputted and the processing is terminated (step 103) to wait for the next processing start timing signal PS (step 101).

The signal PS is generated by the IOC 1 as follows.

Figure 3:
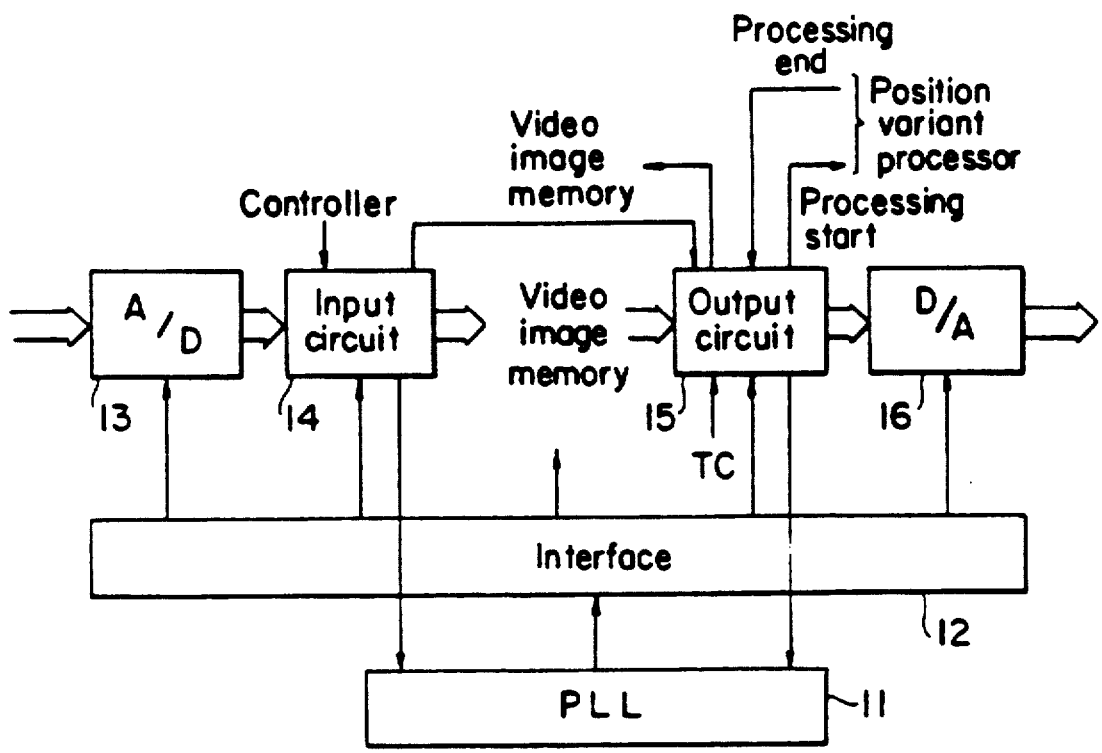
FIG. 3 is a block diagram showing an embodiment of an input/output section of the data processor of FIG. 1.

The IOC 1 is configured as shown in FIG. 3, for example.

That is, the PLL circuit 11 for generating a clock generates the clock which is locked for the phase of, for example, the subcarrier of the input video signal.

The interface 12 effects a division on the clock from the PLL circuit 11 and applies a delay on some of the resultant signals, and then the obtained signals are transmitted to the relevant sections in the IOC 1, the VIMIN 2A, and VIMOUT 2B.

In the A/D converter 13, the input video signal is converted by use of a sampling clock (for example, 14.32 MHz) from the interface 12 into the digital image data in which eight bits are generated for each sampling.

The input circuit 14 is supplied with a digital image data from the A/D converter 13, and the data is transferred to the VIMIN 2A to be written therein.

In this case, a signal specifying the signal system (NTSC or R/C/B system) is supplied from the TC 4 to the input circuit 14. For the NTSC signal, two sheets of frame memory (or exceeding two sheets) are assigned as the input image memory and the data is alternately written in the memory. On the other hand, for the R/G/B signal, six sheets of frame memory among the 12 sheets thereof are assigned as the input image memory and the data is alternately written in two sheets of frame memory for each principal color. The data is read from any frame memory for which the write operation is not conducted.

As described above, the image data stored in the memory is separated from the IOC 1 and the data flow is then controlled by the PVP 3B.

In this case, this input circuit 14 supplies the VIMIN 2 with only the effective signal of the image signal from which the sync signal and the burst signal portion are removed and the obtained signal is written in the frame units according to the clock delivered from the interface 12.

In addition, in the input circuit 14, the phase of the burst signal in the video signal and the phase of the clock are compared, and the output of the comparison result is supplied as a phase control signal to the PLL circuit 11. The clock from the PLL 11 is subjected to the phase lock operation with respect to the subcarrier in the video signal.

Moreover, in the input circuit 14, a signal for extracting the burst signal, a valid/invalid signal indicating whether or not the sync signal and the burst signal portion are included in the image signal, a frame start signal FL indicating the first line of each frame, a signal indicating the vertical blanking of each field, and a video ID signal with a signal indicating the start of the line are generated and are used therein; furthermore, these signals are supplied for the processing thereof to the output circuit 15 to be described later.

The output circuit 15 is supplied with the processed video data read from the VIMOUT 2B on the frame-by-frame basis.

In the data thus read, the sync signal does not include the burst signal; consequently, the output circuit 15 includes an ROM for generating a sync signal, a burst signal, and a vertical blanking signal. In the NTSC signal system, the data from the VIMOUT 2B is sent to the D/A converter together with the sync signal, the burst signal, and the vertical blanking signal (after being rearranged if necessary).

In addition, in a case of the signals representing three principle colors, an external sync signal is also required, and the sync signal is also regenerated by this output circuit 15 and is supplied to circuits such as for the monitor.

Furthermore, the output circuit 15 generates a signal for controlling the VIM 2. Namely, a dominant mode signal for indicating whether the VIM 2 is in the mode to be controlled by the IOC 1 or by the PVP 3B is generated and is fed to the VIM 2. Among the frame memory sheets of the VIM 2, only a memory to which an input data is delivered or from which an output data is read according to the dominant mode signal is placed under control of the IOC 1. The change-over timing of the dominant mode signal is determined according to the signal OK.

The output circuit 15 further generates an address signal of the VIM 2 and a write enable signal for controlling a read/write operation, and the signals are transmitted to the memory under control of the IOC 1 associated with the VIM 2. The memory dominated by the PVP 3A is supplied with the address and other control signals from the PVP 3B.

Moreover, the output circuit 15 generates a processing start timing signal PS from the frame start signal FL indicating the first line of each frame from the input circuit 14 and the processing end signal OK from the PVP 3B.

Figure 4:
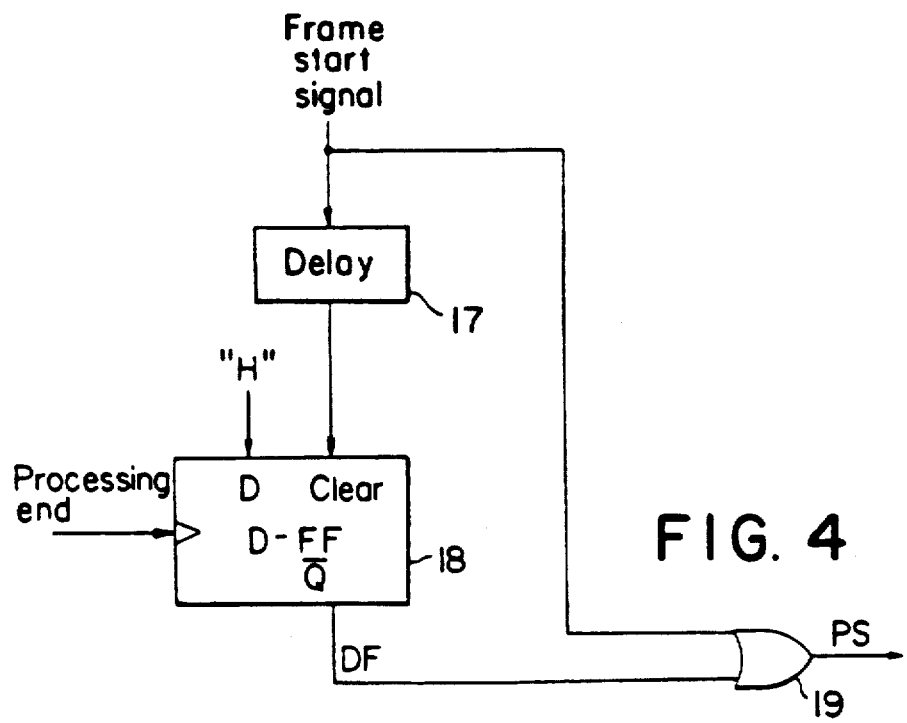
FIG. 4 is a schematic block diagram illustrating an embodiment of the substantial section of the input/output section of FIG. 3.

That is, in an example of means for generating the signal PS as shown in FIG. 4, the frame start signal FL is at a low level for a period of a clock at the start point of each frame (FIG. 5A). The frame start signal FL is delayed by a period of a clock in the delay circuit 17 and is then supplied to the clear terminal of the D-type flip-flop 18. On the other hand, at the end of the processing, the clock terminal of the flip-flop 18 is supplied with a signal OK from the PVP 3B to be set to a high level for a period of a clock FIG. 5B).

Moreover, the D input of the flip-flop 18 is always at the high level.

Consequently, until the signal OK is received, this flip-flop 18 is cleared by the frame start signal FL and hence the $\bar{Q}$ output DP thereof (FIG. 5C) is kept remained at the high level.

When the signal OK is received, the output DF of this flip-flop 18 is set to the low level.

The output DF is supplied to the OR gate 19. The OR gate 19 is in turn supplied with a frame start signal FL. The output from this OR gate 19 is the signal PS (FIG. 5D), and if the frame start signal FL is received when the output DF is at the low level, the output PS is set to the low level for a period in which the signal FL is at the low level.

Only when the signal OK is obtained, the processing start timing signal PS synchronized with the frame can be attained.

When executing a realtime processing, the signal OK is obtained for each frame end in any case, and hence the signal PS becomes identical with the frame start signal FL.

On the other hand, if the processing time is longer than a frame, the signal PS is different from the frame period and can be first obtained only in the next frame following an output of the signal OK.

In the case of this example, the following three modes can be selected for the image data processing.

1 A processing is conducted once per N frames. The realtime processing is executed for N = 1.

2 The frame subsequent to the point of time when the preceding processing is finished is automatically fetched for the processing.

3 The frame following the time of point indicated by the user, for example, through a push button, is fetched for the processing.

Although, in the case described above, the entire data processing is automatically accomplished without necessitating human intervention, namely, the frame next to the time when the preceding processing is finished is automatically fetched for the processing, it is also possible that to enable the user to process the desired frame data, a manual switch is disposed for this purpose; and when the user specifies a frame to be processed, the signal PS is to be gated at the specified frame, that is, the signal PS is obtained only at the start point of the specified frame.

In this invention, since the processing start timing signal is generated after a signal indicating the completion of a data processing is received from the data processing section, there does not occur an inconsistency that the next processing start signal is generated before the preceding processing is finished.

Moreover, the processing start timing need not be determined with a margin of processing time, and hence an effective data processing can be accomplished.

The image data processing is effected as described above.

In the data processing section 3, an image processor achieving the computer processing is used. In this case, by use of the characteristic of the image data which is regularly arranged in a 2-dimensional array, a method for arranging a plurality of unit processors each having the same configuration and for operating the processors at the same time is adopted as a method for processing the image data at a high speed.

In a system in which a plurality of subsystems coordinate with each other to execute a processing, it is necessary to correctly control the operation timing for indicating the processing start and processing branch of each processor.

In this case, in addition to a case where the plurality of processors can be controlled at the completely same operation timing, there are cases where the different timing is required, namely, each processor must be started with a slight timing difference. As a method for controlling the timing, it is common to effect a independent timing control by independently sending a operation timing signal to each subsystem rather than to effect the timing control with a timing control system.

However, in a case where each subsystem is independently controlled, the equal number of timing control lines and subsystems are required, which leads to a difficulty that the size of the timing control system becomes large.

To overcome this difficulty according to the present invention, as shown in FIG. 6, the timing signal is shared among the plurality of subsystems.

In the configuration of FIG. 6 showing the timing control section, a timing control processor 30 is disposed as the main processor in the PVP 3B as described before. The processor 30 is supplied with the processing start signal PS from the IOC 1. The IOC 1 is in turn supplied with the processing end signal OK from the processor 30.

When a condition that the processing start timing signal PS is set to the low level is detected, the processor 30 sends as a timing signal TS a time series signal having a width of one bit to the other processors 31, 32, 33, etc. in the PVP 3B; furthermore, the timing signal TS is transmitted also to the processors 34, 35, 36, etc. of the PIP 3A. In this case, the 60 sheets of processors in the PIP 3A are controlled in groups each including ten sheets of processors.

The processors 31, 32, 33, etc. and 34, 35, 36, etc. each are provided with a decoder for the timing signal TS.

Figure 7:
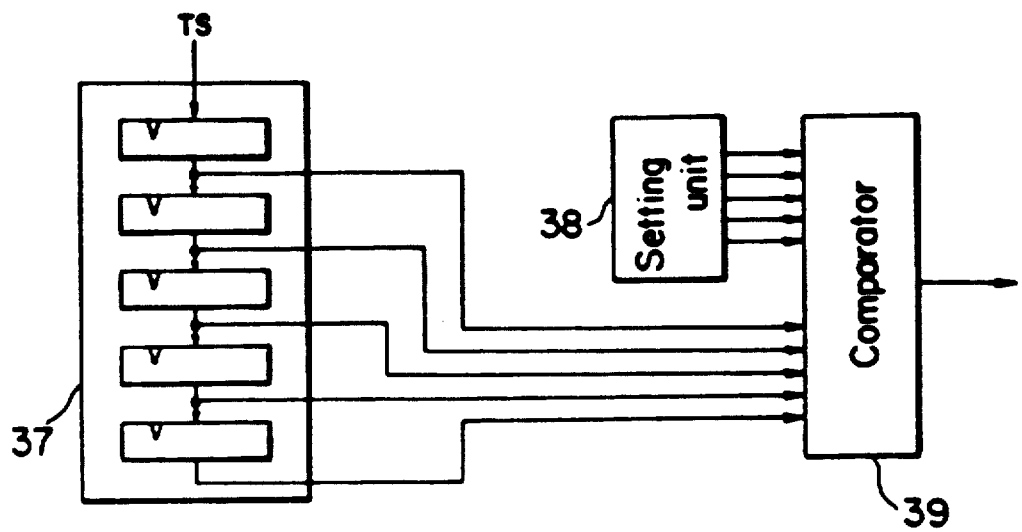
FIG. 7 is a block diagram depicting an embodiment of the substantial section of the circuits shown in FIG. 6.

In an example of the decoder shown in FIG. 7, the decoder comprises a shift register 37, a bit pattern setting unit 38, and a comparator 39.

The shift register 37 sequentially receives the timing signal TS from the control processor 30. In this case, the shift clock of the shift register 37 is synchronized with the transmission timing clock of the timing signal TS or is a clock having a frequency higher than the frequency of the transmission timing clock.

The timing signal TS is transmitted in the bit-by-bit basis in response to the transmission timing clock, so that the signal is fetched into the shift register 37 such that, for example, a bit pattern of five bits are sequentially shifted bit by bit.

A particular bit pattern specific to each processor is set to the pertinent bit pattern setting unit 38.

The comparator 39 compares the 5-bit pattern of the timing signal TS stored in the shift register 37 with the 5-bit pattern in the setting unit 38. If the patterns match with each other, the operating timing signal TP of the processor to which this decoder is set is delivered from the comparator 39.

Assuming now that, for example, a bit pattern [1001] is contained in the setting unit 38, the comparator generates an operation timing signal TP at the timing when the bit pattern of the shift register 37 changing for each transmission clock becomes [1001].

Consequently, if a bit pattern to be set by the bit pattern setting unit 38 of each decoder of the processors 31, 32, 33, etc. and 34, 35, 36, etc. is assigned for each processor, the operation timing signal TP is respectively generated at the specific timing.

In this case, the timing control processor 30 saves the bit pattern of the setting unit 38 of each decoder of the processors and performs an arithmetic processing, for example, to determine the transmission sequence of [0111] of the timing signal TS so as to supply a desired operation timing to each processor, and then the timing signal TS is sent to the processors, thereby accomplishing the timing control of each processor.

In this case, the bit pattern to be set by the bit pattern setting unit 38 may contain data of which the number of bits is equal to or more than the number of bits of the shift register 37; furthermore, the number of bits may vary for each register.

For example, in a case where the processing is to be started when [101] and [1001] are detected by the processors 31 and 34, respectively, if a time series signal [1] . . . [11011] . . . [10011] . . . is transmitted as the timing signal, the processors 30 and 34 can be operated at the preceding timing of [101] and at the succeeding timing of [1001], respectively.

In addition, in a case where the processing is to be started when [10] and [100] are detected by the processors 32 and 33, respectively, if a time series signal [1] . . . [11011] . . . is transmitted as the timing signal, the processor 33 can be operated at the preceding timing delayed by a transmission clock cycle with respect to the processor 32.

Incidentally, without operating the decoder as shown in FIG. 5, each processor can perform a software processing to detect the bit pattern, thereby obtaining the operation timing.

Moreover, other than the bit pattern described above, [1] may be transmitted in other than the transmission of the timing signal TS and [0] may be sent in the transmission of the timing signal TS, so that each processor counts the frequency of [1] to determine the operation timing. In this case, the frequency may be changed for each processor so as to determine the specific operation timing for each processor.

As described above, the timing signal TS may be other than one bit wide, namely, the width may be of several bits; however, in such a case, the bit-parallel signal comprising a plurality of bits is required to be used as the timing signal, and hence a plurality of transmission lines are required. In a case of a 1-bit wide signal, only a transmission line is required.

As described above, according to the present invention, the timing signal is shared among a plurality of subsystems and the decode processing of the timing signal in each subsystem, namely, the algorithm for detecting the operation timing of each subsystem is changed, thereby enabling to supply of the respective processing timing to the plurality of subsystems by use of a small-sized hardware.

The processors constituting the PIP 3A and the PVP 3B each comprise a control section provided with a microprogram stored therein for outputting a microinstruction and an arithmetic section for executing an arithmetic operation according to the microinstruction. The input digital data is supplied to the arithmetic section. A portion of the information of the arithmetic section is fed to the control section so as to reflect the arithmetic information to the program and the result of the arithmetic operation is obtained as output digital data from the arithmetic section.

The arithmetic section of the processor includes a multiplier, an adder/subtractor, and a factor memory for storing factors or coefficients necessary for the arithmetic operation such as for $\sin \theta$ and $\cos \theta$.

In the processor described above, in addition to the signal value calculation for calculating an output data value from the input data, there are various kinds of values associated therewith other than the signal value calculation, for example, an address for determining a factor to be read from the factor memory and a count of a so-called DO loop to be determined according to the processing content.

However, in a case where the calculation of the various kinds of values other than those related to the signal value calculation is also accomplished by use of the arithmetic section achieving the signal value calculation, the calculation time therefor is particularly required, which lowers the data processing speed.

Figure 8:
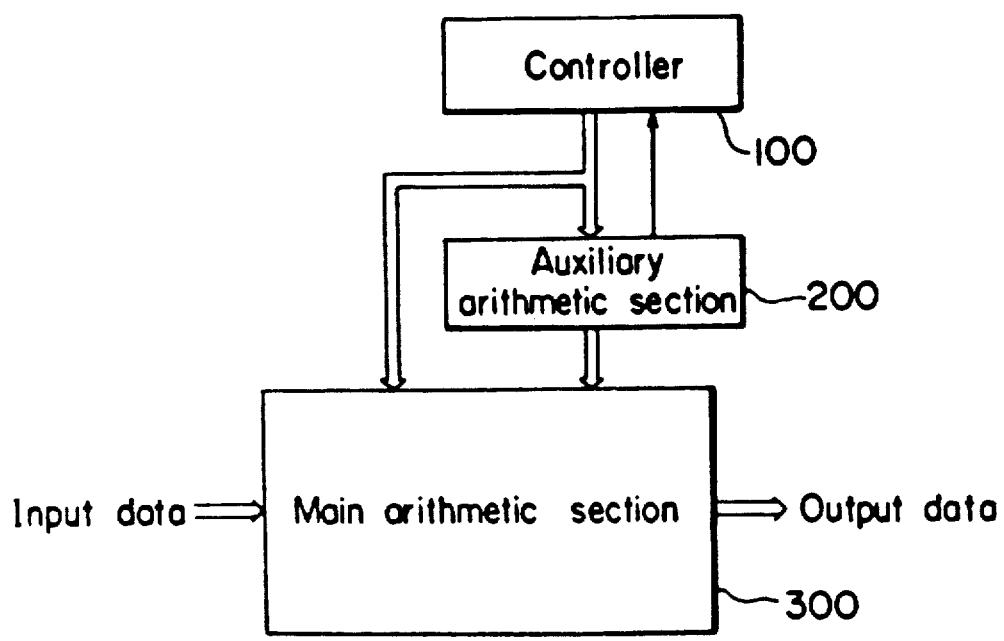
FIG. 8 is a schematic block diagram illustrating an embodiment of the circuits of the data processor of FIG. 1.

FIG. 8 is a block diagram showing the overall configuration of an example of a processor for the digital operation to be used in the data processor according to the present invention. In this example, the microinstruction from the controller 100 is supplied to the main arithmetic section 300 and the auxiliary arithmetic section 200.

The main arithmetic section 300 is supplied with input data, which is then subjected to a signal value calculation, and then an output data is generated and is delivered.

The auxiliary arithmetic section 200 generates addresses of the factor memory and the data memory disposed in the main arithmetic section 300 as will be described later and performs a computation for obtaining the value of repetition of the DO loop, and the addresses and the DO loop repetition value are delivered to the main arithmetic section 300 and the control section 100, respectively.

Figure 9:
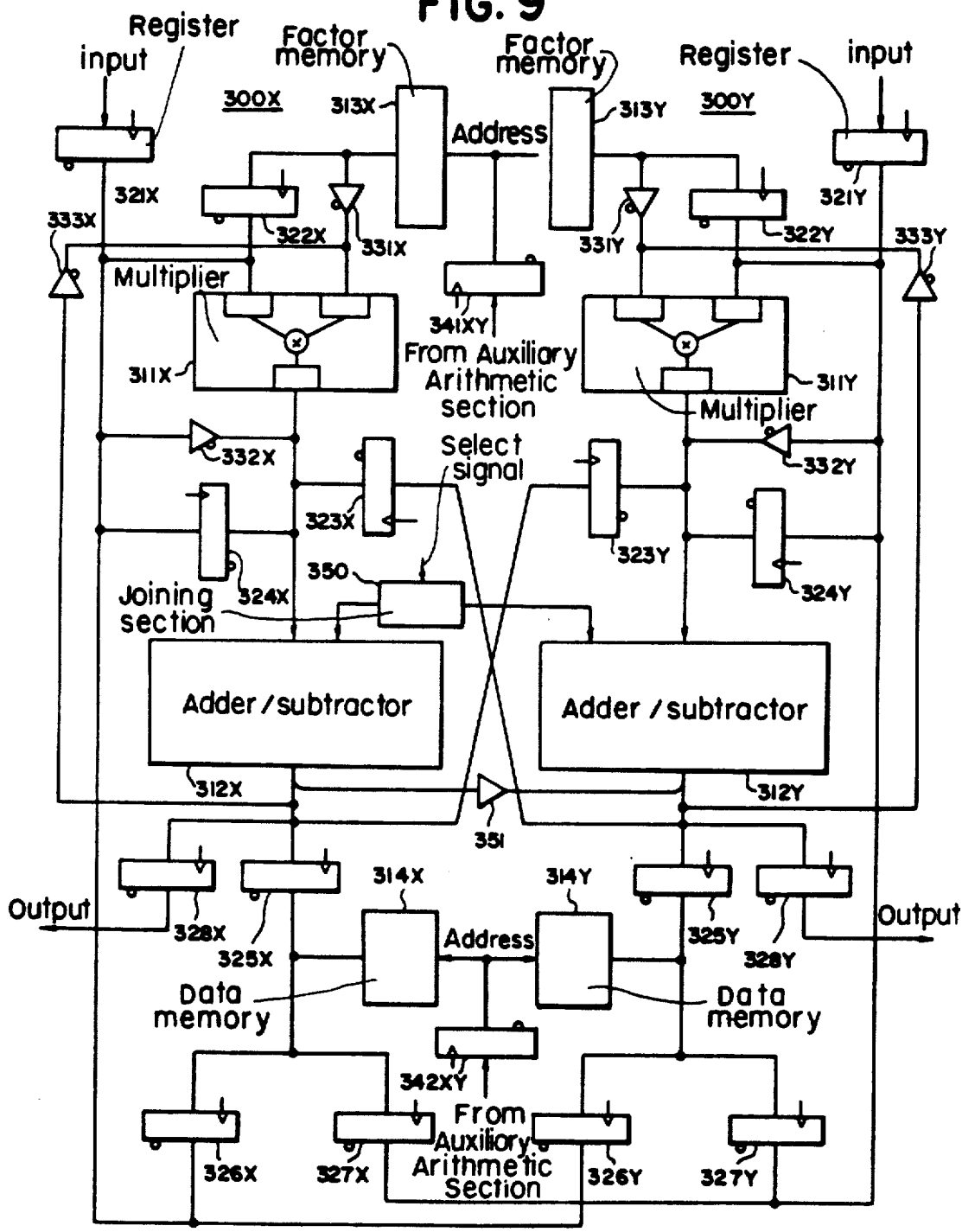
FIG. 9 is a block diagram depicting an embodiment of a main arithmetic section shown in FIG. 8.

FIG. 9 is a block diagram showing an example of the main arithmetic section 300 in which two systems of data operation units each for 8-bit operation are provide for the general-purpose processing, so that a 16-bit data operation is enabled in the system as a whole.

That is, the arithmetic units 300X and 300Y each have the completely same configuration, and hence the same reference numerals are assigned to the corresponding sections thereof together with suffix letters X and Y.

Namely, the first arithmetic unit 300X comprises a multiplier 311X, an adder/subtractor 312X, a factor memory 313X, a data memory 314X, a plurality of registers 321X-328X, and tristate buffers 331X-338X.

The control section 100 sends microinstructions to determine whether or not the outputs from the registers 321X-328X are to be enabled, whether or not the data is to be fetched, or whether or not the multiplier 311 is to be operated.

The tristate buffers 331X-338X are also controlled by the microinstructions.

In the first arithmetic unit 301X, the input data is fed to the register 321X and the register 328X delivers an output data.

The factor memory 313X contains the factor or coefficient data such as cos $\theta$ and sin $\theta$. When an address signal is supplied from the auxiliary arithmetic section 200 via the register 341XY to the factor memory 313X, a factor necessary for a signal value calculation is appropriately read therefrom.

The data memory 314X is used to store the output data generated when necessary. when an address signal is supplied from the auxiliary arithmetic section 200 via the register 342XY to the data memory 314X, the data is read therefrom as appropriately.

The second arithmetic unit 300Y is similarly configured in which the input data is supplied to the register 321Y and the register 328Y delivers the output data. An address from the auxiliary arithmetic section 200 is supplied via the register 341XY to the factor memory 313Y, whereas an address from the auxiliary arithmetic section 200 is fed via the register 342XY to the data memory 314Y.

In this case, the first arithmetic unit 300X and the second arithmetic unit 301Y are so designed to process 16-bit data, namely, 32-bit data can be processed in the system as a whole. The system is configured to be capable of achieving a general-purpose processing so that the processing may be effected on either one of the first and second arithmetic units 300X and 300Y; moreover, the outputs from the adder/subtractor 312X and 312Y are supplied to the registers 323Y and 323X, respectively, whereas the outputs from the registers 327X and 327Y are delivered to the register 324 and the multiplier 311 and the register 324X and the multiplier 311X, respectively, thereby enabling information communication between the arithmetic sections 300X and 300Y.

Furthermore, the adder/subtractor units 312X and 312Y are linked to each other by use of a joining section 350. When a predetermined select signal is supplied to the joining section 350, the operation can be changed between two modes, namely, whether the respective adder/subtractor units 312X and 312Y each operate as a 16-bit adder/subtractor with the single precision or two adder/subtractor units 312X and 312Y operate as a unit to operate as a 32-bit adder/subtractor with the double precision.

In this example, the adder/subtractor units 312X and 312Y each are constituted as a 16-bit adder/subtractor, for example, including four microprocessors Am2901 of AMD as a unit. The adder/subtractor, for example, includes a RAM which is capable of storing 16 items of 16-bit data. The 16-bit data items are arranged so as to be shifted in the column direction according to the numeric relationships such as $\frac{1}{2}$ time, 2 times, and so on.

In a parallel processing system based on the above-mentioned multiprocessor configuration, the TC 4 performs a comprehensive control in three modes to be described later, thereby enabling the processing execution, the processing termination, and the program transfer (exchange) without any inconsistency.

Figure 10:
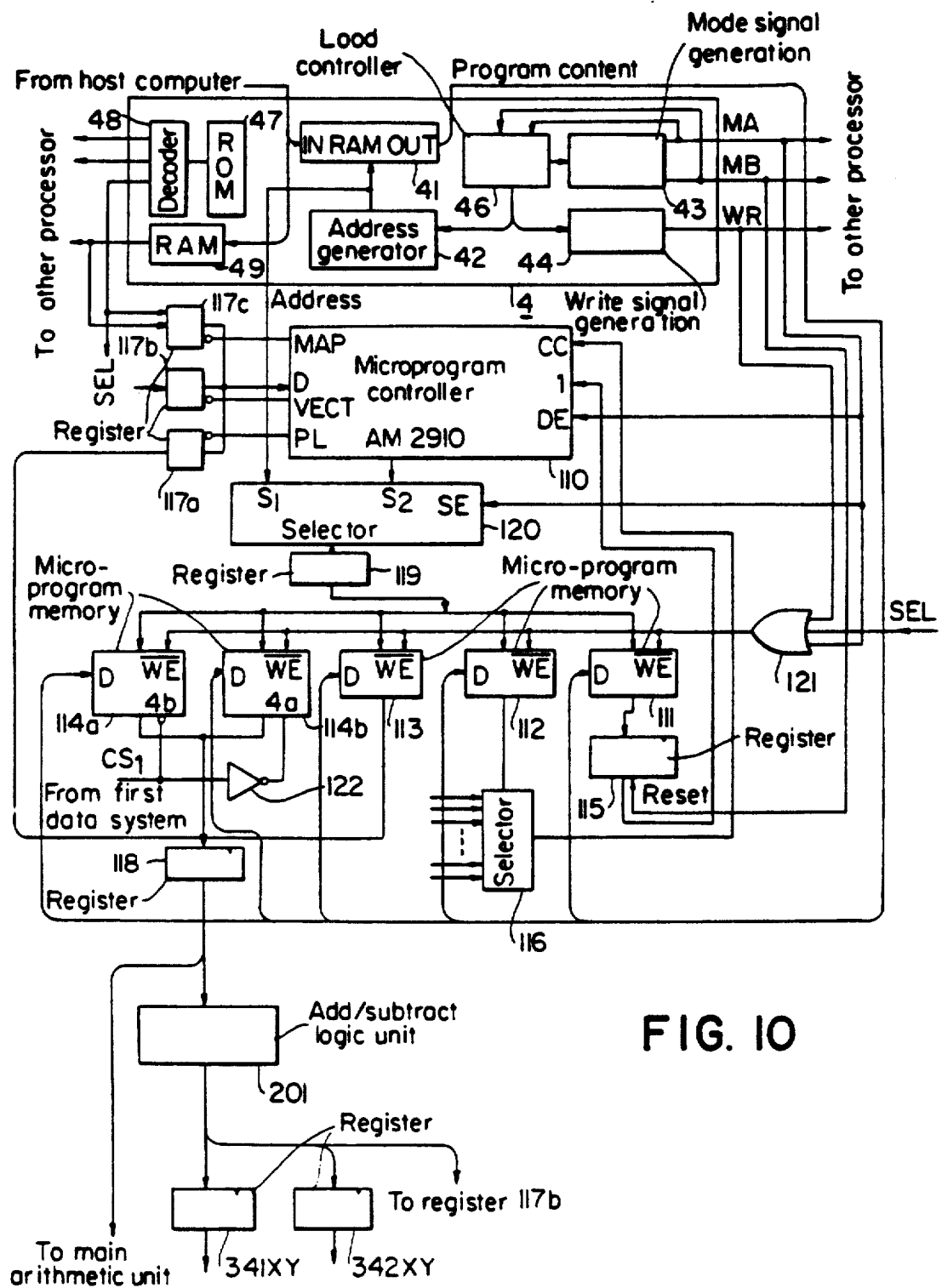
FIG. 10 is a block diagram showing an embodiment of a control section and an auxiliary arithmetic section of FIG. 8.

FIG. 10 shows the connecting relationships between the TC and the control section 100 of one of the plural processors of the PIP 3A and the PVP 3B. This configuration applies to all the processors effecting the program exchange.

That is, in this diagram, the components other than the TC 4 constitute an example of the configuration of the control section of the processor.

The microprogram controller 101 generates addresses of the microprogram memory 111-114a and 114b constituted from the RAM.

From the microprogram memory 111, for example, four instruction bits are obtained to select one of a plurality of instructions of the microprogram controller 110, and the instruction bits are supplied via a register 115 to an instruction terminal I of the controller 110.

In this case, the controller posseses 16 kinds of instructions.

Moreover, the selector 116 is supplied with a plurality of 1-bit information items, and one of these items is selected according to an information read from the microprogram memory 112. The 1-bit information from the selector 116 is supplied as a condition code to the terminal CC of the program controller 110 and is then combined with the instruction bits so as to be used as an information to select the next address as a data incerement, an address to be supplied to the direct input terminal D, or other address.

An information, for example, a destination address of a GO TO statement or an information of the repetition value of a DO loop is obtained from the microprogram memory 113 and is then latched into a register 117a.

Prom the micro program memory 114a and 114b, an information of the microinstruction is extracted. this information is supplied via the register 118 to the arithmetic section of this processor, and all or a part of the microinstruction is supplied to the add/subtract logic unit 201 as an auxiliary arithmetic section 200.

The microprogram controller 110 is so designed to enable one of three enable signals PL, VECT, and MAP depending on the instruction bit. Consequently, one of the registers 117a-117c is enabled by the instruction bit, and the address latched in the register is used as the direct input. In most instructions, the signal PL is enabled, namely, the signal VECT or MAP is enabled only for a particular instruction. Furthermore, whether the direct input is to be selected in the instruction bit state is determined according to the condition code from the selector 116.

On receiving a microinstruction, the add/subtract arithmetic unit 201 obtains through calculation address signals of the factor memory 313X and 313Y and the data memory 314X and 314Y of the main arithmetic section 300 and supplies the obtained address signals to the registers 341XY and 342XY for the storage.

In the add/subtract arithmetic unit 201, an information such as the repetition value of a DO loop is obtained through a computation and is fed, for example, to the register 117b for storage.

Operations in the auxiliary arithmetic section 200 are relatively simpler than the signal value calculation of the main arithmetic section 300; consequently, as the example described above, the auxiliary arithmetic section 200 can be of a small size as hardware like the add/subtract arithmetic unit 201.

As described above, when the auxiliary arithmetic unit 200 is provided, for example, in a case where a computation of the total of operations between the coefficients KA(a$_1$), KA(a$_2$), . . . KA(a$_n$) at the addresses a$_1$, a$_2$, . . . a$_n$ of the factor memory 313X and the data TA(a$_1$), TA(a$_2$), . . . TA(a$_n$) at the respective addresses of a$_1$, a$_2$, . . . a$_n$ of the data memory 314X, namely, KA(a$_1$) * TA(a$_1$) + KA(a$_2$) * TA(a$_2$) + . . . + KA(a$_n$) * TA(a$_n$) and a computation of the total of operations between the coefficients KB(a$_1$), KB(a$_2$), . . . KB(a$_n$) at the addresses a$_1$, a$_2$, . . . a$_n$ of the factor memory 313Y and the data TB(a$_1$), TB(a$_2$), . . . TB(a$_n$) at the respective addresses of a$_1$, a$_2$, . . . a$_n$ of the data memory, namely, KB(a$_1$) * TB(a$_1$) + KB(a$_2$) * TB(a$_2$) + . . . + KB(a$_n$) * TB(a$_n$) are effected at the same time, the processing can be accomplished in n steps or slightly greater than n steps as compared with 2n steps required in the prior art technique, which improves the processing speed.

According to the present invention, since the auxiliary arithmetic section is provided to calculate values such as the memory address of the factor memory of the main arithmetic section performing the signal value calculation, the operations such as the address value calculation conventionally achieved in the main arithmetic section are relieved therefrom, and hence the main arithmetic section effects only the signal value calculation, thereby increasing the execution speed of the processing.

Furthermore, since the operations in the auxiliary arithmetic section do not necessitate a large-sized hardware in most cases required by the signal value calculation in the main arithmetic section, which leads to an advantage that only a small-sized hardware is added to the auxiliary arithmetic section.

In a case where a so-called adaptive processing is executed according to the information from the arithmetic section and other processors, the selector 116 is supplied as an input information the information from the arithmetic section and the information from other processors, and depending on the information, an instruction, for example, a conditional jump is effected.

However, in a case of the programming system for the adaptive processing described above, even a trixial adaptive processing, for example, a calculation of an absolute value gives an influence on the flow of program addresses due to a conditional jump or the like.

Moreover, when several data flows exist for the respective arithmetic processing in a processor, there arises an inconvenience that a program generated by use of such a condition code cannot cope with the processing of the data associated with the respective data flows.

In the present example, the memory units 114a and 114b are provided as the microprogram memory for supplying microinstructions to the first data system. The outputs from the memory 114a and 114b are connected (wired ORed) with each other and are linked via the register 118 to the first data system.

The information from the first data system is supplied as the chip select signal CS$_1$ to the memory 114a and is delivered via an inverter 122 to the memory 114b.

As an example, the contents of the microprogram memory 114a and 114b in a case where a computation of C = A + |B| is achieved will be as follows.

| Address | Contents of memory 114a | Contents of memory 114b |
|---|---|---|
| 0 | Input data A to ALU | Input data A to ALU |
| 1 | Check the sign of B | Check the sign of B. |
| 2 | C = A + B | C = A − B |

That is, although the contents of the addresses 0 and 1 of the memory 114a and 114b are the same, the contents of address 2 varies depending on the sign of data B. Since the signal of the digital data is positive if the MSB is 0 and the signal is negative if the MSB is 1, the MSB of the data B is supplied as the chip select signal CS$_1$. As a result, if the MSB is 0 indicating the positive sign, the memory 114a is selected and an operation C = A + B is accomplished in the arithmetic section, whereas if the MSB is 1 indicating the negative sign, the memory 114b is selected and an operation C = A − B is executed in the arithmetic section.

As described above, without changing the address flow, namely, the program flow itself, an adaptive processing such as a calculation of an absolute value can be conducted.

That is, with the provision that based on a signal of a data system, a program memory associated with instructions controlling the data system can be selected, the adaptive processing can be easily accomplished for each data system.

If the address capacity of the program memory is greater than the program length, it is possible to dispose two memories such as the memory 114a and 114b of the example described above. These memory units are not selected through a chip select operation, namely, two kinds of program contents are written in a memory device, thereby enabling to select one of these two kinds of programs by supplying the information from the data system to the MSB of the address.

According to the present invention, since a plurality of program contents are prepared and one of the programs is selected depending on the information from the data system, the adaptive processing associated with the information from the data system can be simply achieved without changing the program flow.

Moreover, when the 4-bit instruction from the register 115 is [0000], a [JUMP ZERO] instruction is assumed and the microprogram controller 110 is set to a state to output an address 0 in any case regardless of the condition code.

On the other hand, the TC 4 comprises a RAM 41 for storing programs to be supplied to the microprogram memory 111-114a and 114b and an address generator 42 for generating the addresses thereof.

In addition, to implement three modes including the execution mode, the reset (halt) mode, and the program exhange mode, the mode signal generation means 43 is disposed to generate 1-bit mode signals MA and MB; furthermore, there is provided the write signal generation means 44 for generating a program write signal for the microprogram memory 111-114a and 114b in the program exchange mode.

Figure 11:
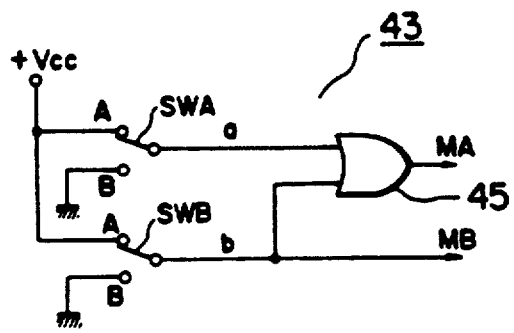
FIG. 11 is a schematic circuit diagram illustrating an embodiment of a mode signal generation circuit of FIG. 10.

The mode signal generation means 43 is configured, for example, as shown in FIG. 11.

That is, switches SWA and SWB are to be changed over by the operator. Each switch has an input A applied with a positive direct current, (dc) voltage the other terminal B grounded. A signal a to be obtained by the switch SWA is supplied to an input terminal of an OR gate 45. A signal b obtained by the switch SWB is delivered as a mode signal MB and is supplied to the other input terminal of the OR gate 45, which in turn delivers a mode signal MA.

In this case, the mode is set as follows depending on the 1-bit mode signals MA and MB.

TABLE 1

| MA = 0 | MB = 0 | Program exchange mode |
|---|---|---|
| MA = 1 | MB = 0 | Reset (halt) mode |
| MA = 1 | MB = 1 | Execution mode |

That is, when the switch SWB is set to the terminal A, the execution mode is set regardless of the state of the switch SWA. If the switch SWA is set to the terminal A and the switch SWB is set to the terminal B, the reset mode is set. If the switch SWB is set to the terminal B and the switch SWA is set to the terminal B, the program exchange mode is set.

As can be seen from Table 1 listed above, when the signal MB is 0, the program execution is stopped, and when the signal MB is 1, the program becomes executable. Consequently, this mode signal MB is signified as a reset (halt) signal.

On the other hand, when the signal MA is 0, the program exchange is possible. This mode signal MA is therefore signified as a change signal.

These two mode signals MA and MB are used to establish the respective modes as follows.

That is, the selector 120 selects addresses for the microprogram memory 111-114a and 114b from the addresses from the program controller 110 and the TC 4. As a select signal for this purpose, the signal MA is supplied. When the signal MA is 1, the address from the microprogram controller 110 is selected, and when this MA is 0, the address from the TC 4 is selected.

In addition, the gate circuit 121 gates the write signal WR according to the gate signal MA. When the gate signal MA is 0, the gate is opened and the signal WR is supplied to each write enable terminal WE of the microprogram memories 111-114a and 114b.

When 0 is supplied to the WE signal of the microprogram memories 111-114a and 114b, the microprogram memory are set to the write enable state.

Moreover, the signal MB is fed to the reset terminal of the register 115, and when this signal MB is 0, the register 115 is reset.

In the TC 4, the states of the mode signals MA and MB are monitored by the load control section 46 so as to control the processing in the TC 4 according to the mode.

In the program execution mode, the mode signal MA is 1, and hence an address from the microprogram controller 110 is obtained from the selector 120, and this address signal is subjected to a delay of a clock via the register 119 and the resultant signal is supplied to the microprogram memories 111-114a and 114b.

Furthermore, the output from the OR gate 121 is 1 in any case when the signal MA is 1, and the memories 111-114a and 114b are therefore not set to the write enable state.

In addition, since the mode signal MB is 1, the register 115 is not reset and the data read from the microprogram memory 111 is subjected to a delay of a clock in the register 115 and is supplied to the instruction terminal of the microprogram controller 110, thereby executing a program.

In this case, the microinstruction read from the microprogram memory 114 is delayed by a clock in the register 118 and is supplied to the arithmetic section.

In the execution mode, the pipeline registers are designed to be disposed as follows. A register 119 is located between the program controller 110 and the microprogram memories 111-114a and 114b, the registers 115 and 117a are disposed between the output sides of the microprogram memories 111-114a and 114b and the program controller 110, and a register (not shown) is connected to the input of the selector 116. This provision enables to decrease the clock cycle.

That is, in the image processing system of this example, the parallel processing method by use of the multiprocessor configuration is primarily adopted, however, the pipeline processing method as described above is also partly utilized to effect a high-speed processing.

In the program transfer mode, the mode signal MB is 0, and hence the register 115 is reset and [0000] is supplied to the instruction terminal of the program controller 110; consequently, the address supplied from this program controller 110 is kept to be 0 or the address output is stopped. Namely, the program addresses for all processors associated with the PIP 3A and PVP 3B are 0 and hence the program stop state is set.

On the other hand, since the mode signal MA is also 0, the selector 120 is set to the state to select the address from the address generator 42 of the TC 4.

That is, in the program transfer mode, the microprogram memory of all processors is under control of the TC 4.

In this case, moreover, the signal MA may be fed to the output enable terminal OE of the program controller 110 so as to set the output buffer of the program controller 110 to off.

Furthermore, according to the program transfer executed by the TC 4 in the program transfer mode, an instruction from the load control section 46 causes the address generator 42 to send an address to the RAM 41, and the program data to be transmitted to the microprogram memories 111-114a and 114b is read from the RAM 41. At the same time, the write signal WR from the write signal generate means 44 is set to 0 and the mode signal MA is 0; consequently, the output from the OR gate 121 is also set to 0, which sets the microprogram memories 111-114a and 114b to the write enable state.

As a consequence, the program data from the RAM 41 is sequentially written in the microprogram memories 111-114a and 114b according to the address from the address generate means 42, thereby achieving the program transfer.

In this example, the program transfer is sequentially accomplished for each processor.

That is, the TC 4 is provided with the ROM 47 in which the processor select signal is stored. When a program is transferred from the ROM 47, the processor select signal is read according to an instruction from the load control section 46. The processor select signal is decoded in the decoder 48 and only the select signal SEL for the processor to be selected is set to 0 and the other signals are set to 1. The select signal SEL is kept supplied to the OR gate 121, and only the microprogram memory 111-114a and 114b of the processor for which the select signal SEL is 0 is set to the write enable state, and then a program rewrite operation is effected.

When a write operation is completed in a microprogram memory of a processor, the processor signal for another processor is extracted from the ROM 47 and the select signal SEL of the processor is set to 0; similarly, the program transfer to this processor is achieved. To change the programs of all processors, the operation described above is repeated as many times as there are the processors.

In this case, if a plurality of programs are to be sent to each processor or if a plurality of different programs are to be transmitted to each processor, these programs are written as a unit in each processor. In each processor, the program to be next executed is specified by supplying an execution start address to each processor.

The execution start address is extracted from the RAM 49 and is supplied to the register 117c of each processor. The select signal SEL is delivered as a latch signal of the register 117c, and at a timing when the select signal changes from 0 to 1, the execution start address is latched.

The register 117c is enabled by the enable signal MAP from the microprogram controller 110, and the latched data is supplied to the direct input terminal D. In the execution mode described above, when a program starts, the address from this register above, when a program starts, the address from this register 117c is fetched into the program controller 110, which in turn generate the addresses beginning from the fetched address.

In this fashion, a program and the execution start address thereof are sequentially transmitted to a processor.

The execution start address for each processor stored in the RAM 49 is supplied from the host computer 5 in advance.

As already described, in the program transfer mode, the microprogram controller 110 continues sending address 0 or is in the stop state.

In the rest (halt) mode, since the mode signals MA and MB are 1 and 0, respectively, an address from the program controller 110 is selected by the selector 120 of each processor and the register 115 is reset by the signal MB; consequently, the program controller 110 continues outputting address 0 and the program execution is stopped in all processors.

Since the signal MA is 1, the microprogram memory units 111-114a and 114b are not supplied with a write signal for a value of 0.

In the reset mode, among a plurality of programs written beforehand in the microprogram memory of each processor, a start address of a program to be executed is reassigned. That is, as in the program transfer operation, the processor select signals are sequentially outputted from the ROM 47 and the execution start address is sequentially supplied from the RAM 49 to each processor, and then the execution start address is sequentially latched into the register 117c of each processor according to the signal SEL.

Consequently, if the execution mode is next established, each processor executes the program beginning from the reassigned execution start address. Namely, without transferring the new program, another program can be executed in each processor.

The three modes described above are controlled by a program of the processor in the TC 4.

In the configuration of FIG. 1, the data processing section 3 reads for processing the necessary items from the image data stored in the VIM 2 and writes the processed data again in the VIM 2. Consequently, for a group of image data, such as a field or frame of image data, in addition to a case where all pixel data items are read for the work thereof, there is a case where only the necessary image data is read from a plurality of fields, a plurality of fields obtained from a frame memory, or data relating to a plurality of frames, and the obtained data is subjected to the work processing to generate a field or frame of data, which is then written in a field or a frame memory. In this case, the control of data internal with respect to the VIM 2 is effected mainly by the address generate section in the data processing section 3. As the address generation section, a processor is utilized, and the processor operates to generate through a calculation addresses for various kinds of processing.

In a processing system (for example, in an image processing system) in which the processing objective is temporarily stored in a store means before its processing and address for the store means is required to be generated as described above, such operations are commonly accomplished by use of a processor. In this case, the characteristic required for the address generation varies depending on the processing kind. Namely, the addresses required for the processing are mainly classified into two types as follows.

1 An address to be regularly outputted at a high speed.

2 An address to be regularly generated and outputted in large amount of computation.

However, in a case where only one of these types of addresses is provided in an address generation processor, it is difficult to implement a processing system suitable for the processing which requires both the two kinds of addresses.

Figure 12:
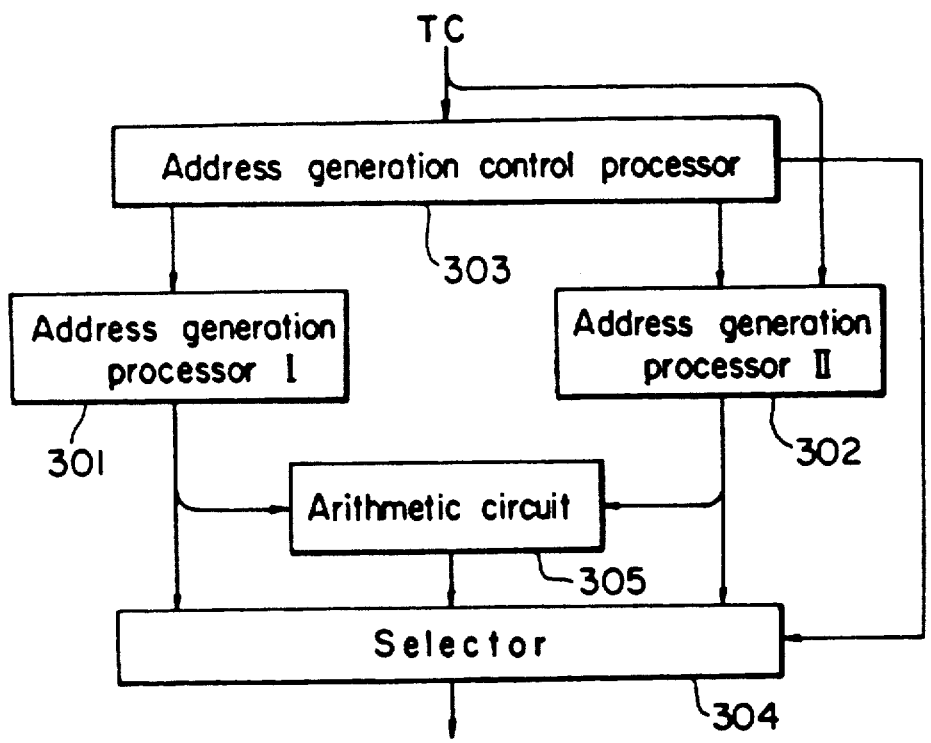
FIG. 12 is a block diagram showing an embodiment of an address generation unit of the data processor of FIG. 1.

In this case, the address generate section of the PVP 3B includes a first processor 301 for generating through a computation a simple address and a second processor 302 for generating through a calculation a complicated address as shown in FIG. 12.

That is, in FIG. 12, the first processor 301 generates a regular, simple address, whereas the second processor 302 can perform a complex operation to generate a complicate address. In addition, reference numeral 303 indicates an address generation control processor for controlling the first and second processors 301 and 302.

Reference numeral 304 denotes a selector which selects from three address data including the address data from the first and second processors 301 and 302 and a compound address data obtained by executing a computation in the arithmetic circuit 305 on the address data from the first and second processors one address data according to a select signal from the address generation control processor 303.

The first processor 301 generates an address for specifying, for example, a rectangular area on a screen and can be implemented by use of counters for this purpose. In this case, the rectangle addresses can be generated in the horizontal and vertical directions.

The second processor 302 is, for example, a general-purpose processor which operates according to a microprogram, and in addition to the linear operation, this processor can achieve the nonlinear operation and an adaptive operation and the program is supplied thereto from the TC 4.

The address generation control processor 303 supplies control signals such as a start signal and parameters to the first processor 301. The second processor 302 is supplied with control signals such as a program start signal, whereas, the parameters and other information are delivered from the TC 4.

Furthermore, the microprogram is fed from the TC 4 to the address generation control processor 303.

In the address generation control processor 303, for example, the sum of the addresses from the first and second processors 301 and 302 is calculated.

Figure 13:
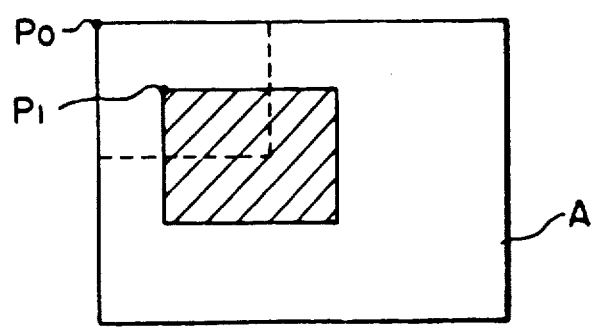
FIG. 13 is a schematic diagram for explaining FIG. 12.
Figure 14:
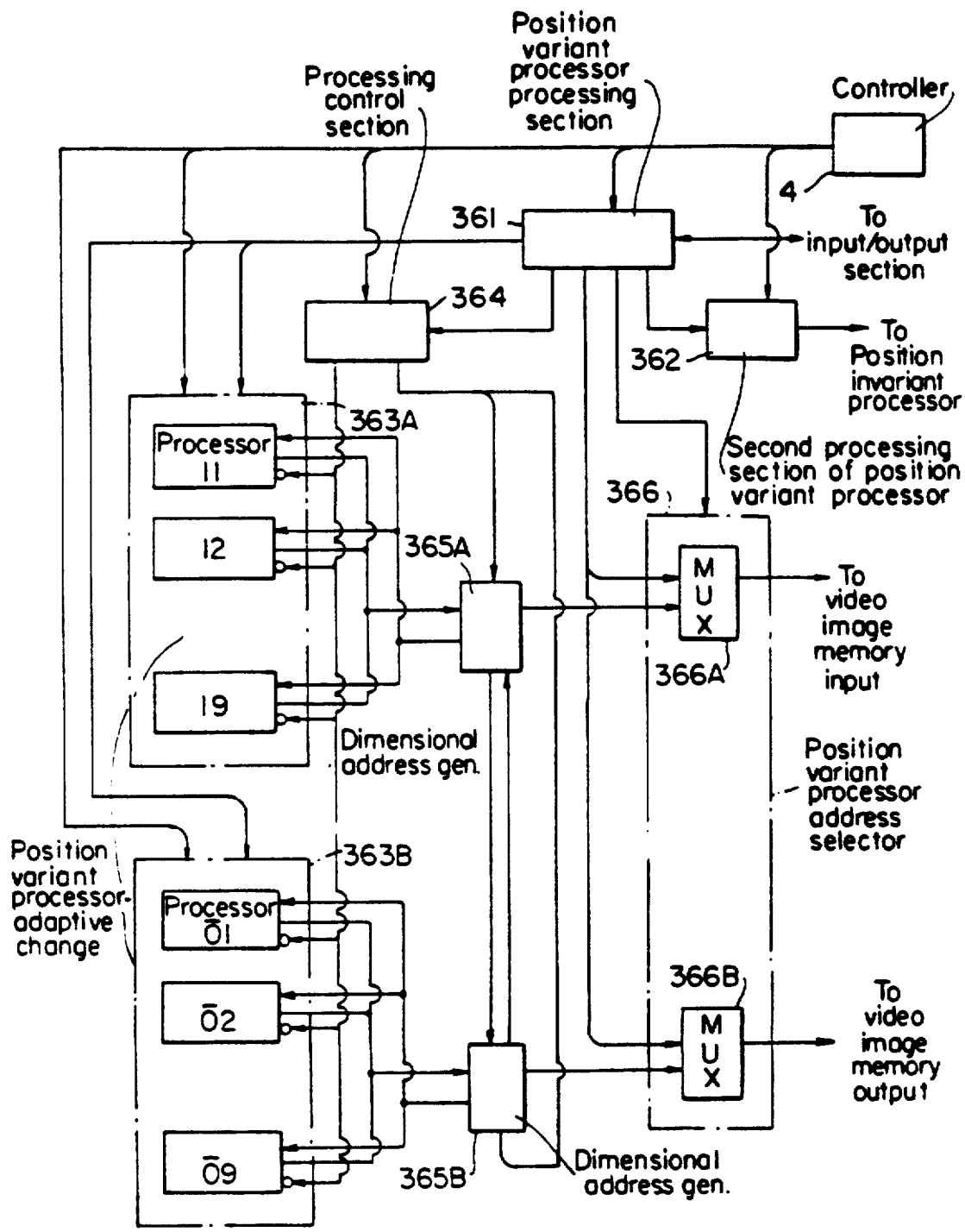
FIG. 14 is a block diagram illustrating an embodiment of circuits of the data processor of FIG. 1.

That is, in a case where addresses are generated for a rectangular area in a portion indicated with the shade in the screen A as shown in FIG. 13, the second processor 302 obtains through a computation the position P of the upper-left corner of the rectangular area, and the address data of the position is kept delivered from the second processor 302 so as to be supplied to the arithmetic circuit 305.

On the other hand, the address generation control processor 303 delivers to the first processor 301 a parameter indicating the size of the rectangular area. The first processor 301 then generates the rectangle addresses ranging from the point $P_0$ of the upper-left corner of the screen A to the portion enclosed with the broken lines. When the sum of the rectangle addresses and the address $P_1$ of the start point is calculated, the addresses are obtained for the objective area indicated with the shade in FIG. 13. The selector 304 selects, an address from the arithmetic circuit 305 based on the select signal from the control processor 303.

If the address generation for the area indicated with the shade in FIG. 13 is to be accomplished by a processor, a calculation to obtain the point $P_1$ and a calculation to regularly generate the addresses of the rectangular portion are required, and the processing speed is lowered; however, as in this example, the second processor 302 keeps outputting the address of the point $P_1$ and the first processor 301 regularly delivers an address at a high speed so that an addition is conducted in the arithmetic circuit 305, thereby enabling to generate a regular address at a high speed beginning from the address calculated by the second processor 302.

In addition to the addresses of a rectangle, the first processor can generate any regular data, for example, an address having the inverted bit order necessary for an operation of the Fast Fourier Transformation (FTT) is generated by the first processor 301. In a case where the selector 304 selects one of the addresses from the first and second processors 301 and 302, one of the following methods can be adopted, namely, the first method in which the, selection is effected according to the address generation speed, the second method in which the selection is achieved according to the processing speed in the PIP 3A executing the arithmetic processing on the pixel data, or the third method in which the selection is conducted according to the total of the processing time for the address generation and for the processing in the PIP 3A. In any case, if a high-speed processing is required, the selector 304 is so designed to receive an address with the high speed. In addition, there is a case where the system selects an address having the less probability of errors even if the processing speed is low.

According to the present invention, since a plurality of addresses are subjected to a selection and are outputted as addresses depending on the processing purpose and usage, the addresses matched for the processing can be effectively generated.

Moreover, in the present invention, a plurality of processors are provided to generate a plurality of addresses, respectively, and in addition to the selection of the generated addresses by use of a selector, the plural addresses thus generated are appropriately computed by another arithmetic circuit and are combined, to generate another address; consequently, the processing capacity is increased in the processing system.

In this system, if the address generation is associated with a simple change, for example, a linear change, the configuration need only include a simple arithmetic section and a control section; however, if the PIP 3A is to achieve a generation of a complicated address, a simple configuration of the PVP 3B cannot sufficiently cope with the condition.

To overcome this difficulty, according to the present invention, the PVP 3B is provided with a PVPP section 361 as a first processing section and information such as a frame start signal is communicated between the PVPP 361 and the IOC 1.

In the PVPP 361, a simple address such as an address of a rectangular area is generated according to a microprogram, and the signals such as a control signal and a timing signal for the other processing section are also generated, thereby controlling the entire operation of the PVP 3B. The addresses of the rectnagular area can be generated in the longitudinal and vertical directions and in the inversed bit sequence.

The control signal from the PVPP 361 is supplied to the PVPCF 362 as the second processing section. In the PVPCF 362, an input/output control signal for the PIP 3A is generated depending on the control signal from the PVPP 361 according to the microprogram and is delivered to the PIP 3A.

Moreover, the control signal from the PVPP 361 is supplied to the PVPCA's 363A and 363B as the third processing sections. Two systems of PVPCA's 363A and 363B are provided for the VIM's 2A and 2B; in addition, the PVPCA's include nine circuits I1–I9 and O1–O9, respectively as the processor sections which are equivalent to the processor section of the PIP 2A. In the processor sections, addresses having a nonlinear change or an adaptive change are generated according to the respective microprograms.

Moreover, the control signal from the PVPP 361 is supplied to the processing control section (CAT) 364, which in turn sends a signal to control the input/output of each processor of the PVPCA's 363A and 363B. Addresses, from the processors of the PVPCA's 363A and 363B are fed to the dimensional address generators (DOG's) 365A and 365B.

Figure 15:
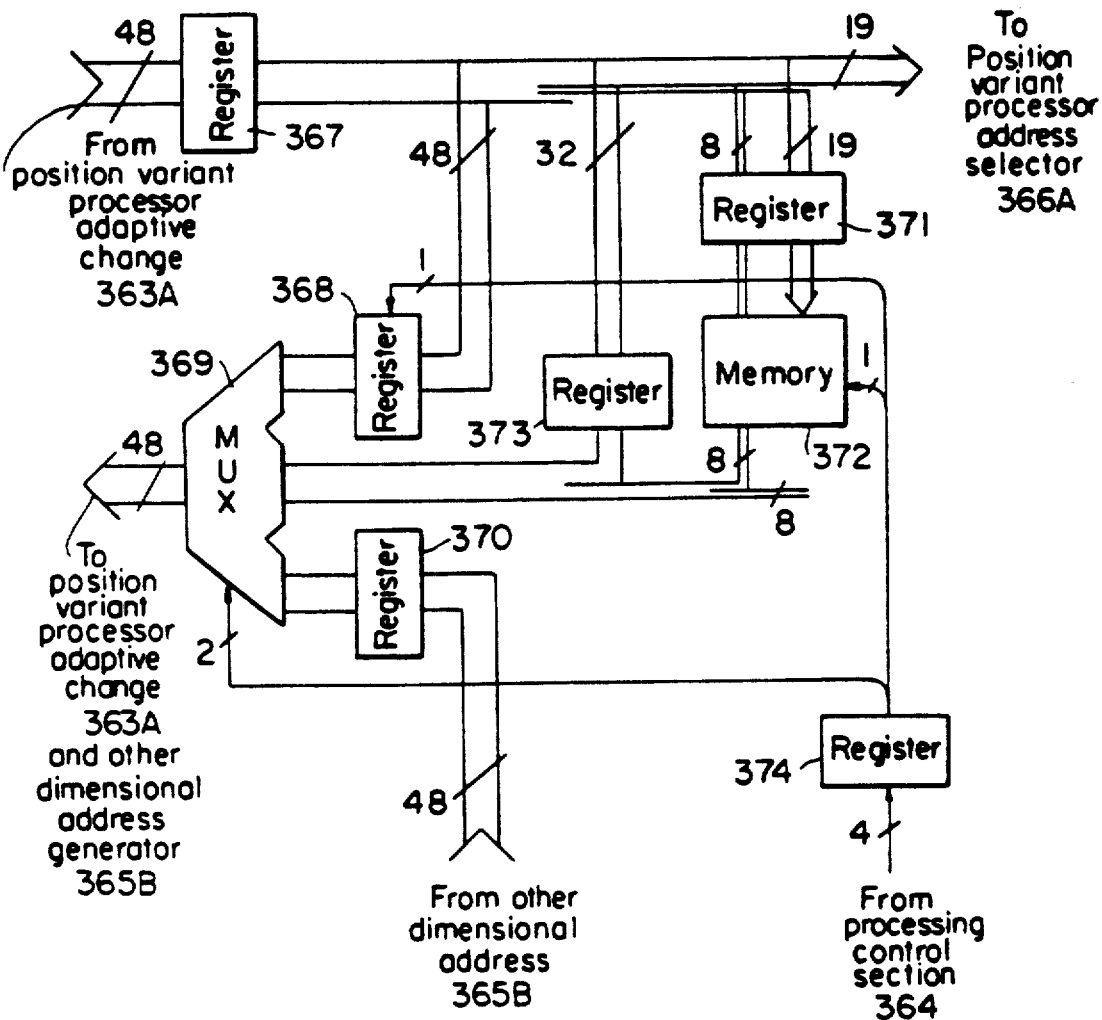
FIG. 15 is a block diagram depicting an embodiment of a dimensional address generator (DOG) section of FIG. 14.

The dimensional address generators (DOG's) 365A and 365B are configured, for example, as shown in FIG. 15. In this diagram, for example, a 3-dimensions constituted from 16 bits for each of X, Y and Z is fed from the PVPCA 363A to the input register 367. Of these bits, the addresses associated with the 19 bits of the X and Y coordinates are outputted to the PVPCNT 366 to be described later. In addition, a 48-bit address is delivered from the register 367 to the address register 368 and is subjected to a predetermined timing matching and other processing; and then the resultant signal is supplied to the PVPCA 363A or the other dimensional address generators (DŌG's) 365B through the first input of the multiplexer (MUX) 369. A 48-bit address from the dimensional address generators (DŌG's) 365B is fed via the register 370 to the second input of the MUX 369. Moreover, the 19 bits address of the x-y coordinate from the register 37 and the eight bits of the z-coordinate address are delivered to the register 37a. The 19 bits thereof are transferred for an address of the memory 372 and the eight bits thereof are supplied for the data of the memory 372. This causes an 8-bit data associated with the z-coordinate to be stored in the memory 372 according to the x-y address. Furthermore, a 32-bit address of x-y coordinate is supplied from the register 367 to the register 373, and then the 32-bit address is fed to the third input of the MUX 369 together with the eight bits read from the memory 372 and additional eight bits, for example, comprising 0, namely, a total of 48 bits are delivered as an address. In addition, a 4-bit control signal from the CAT 364 is fed to the register 374 and is used to control the timing of the register 368, the selection on the three inputs of the MUX 369, and the write operation on the memory 372.

As a result, in the dimensional address generators (DOG's) 365A and 365B, the addresses from the processors of the PVPCA's 363A and 363B are delivered and are further retransmitted to the PVPCA's 363A and 363B for complicated processing; furthermore, a communication is conducted with the other dimensional address generators (DŌG's) to relate the addresses on the input and output sides to each other. In addition, the z-coordinate address data may be stored to be correspond to the 3-dimensional information and the pixel index.

The addresses from the dimensional address generators (DOG's) 365A and 365B and the address generated by the PVPP 361 are transmitted to the select circuit PVPCNT 366, which in turn supplies the addresses to the MUX 366A and the MUX 366B. These MUX's 366A and 366B are controlled by the PVPP 361 to obtain the addresses from the dimensional address generators (DŌG's) or PVPP or to generate an address by adding the addresses. The resultant addresses are delivered to the VIM's 2A and 2B.

The address generation is conducted as described above. According to this system, since the functions necessary to generate addresses and control signals are efficiently subdivided, the loads on the respective processing sections can be reduced and the processing including the complex operations can be quite simply accomplished.

Figure 16:
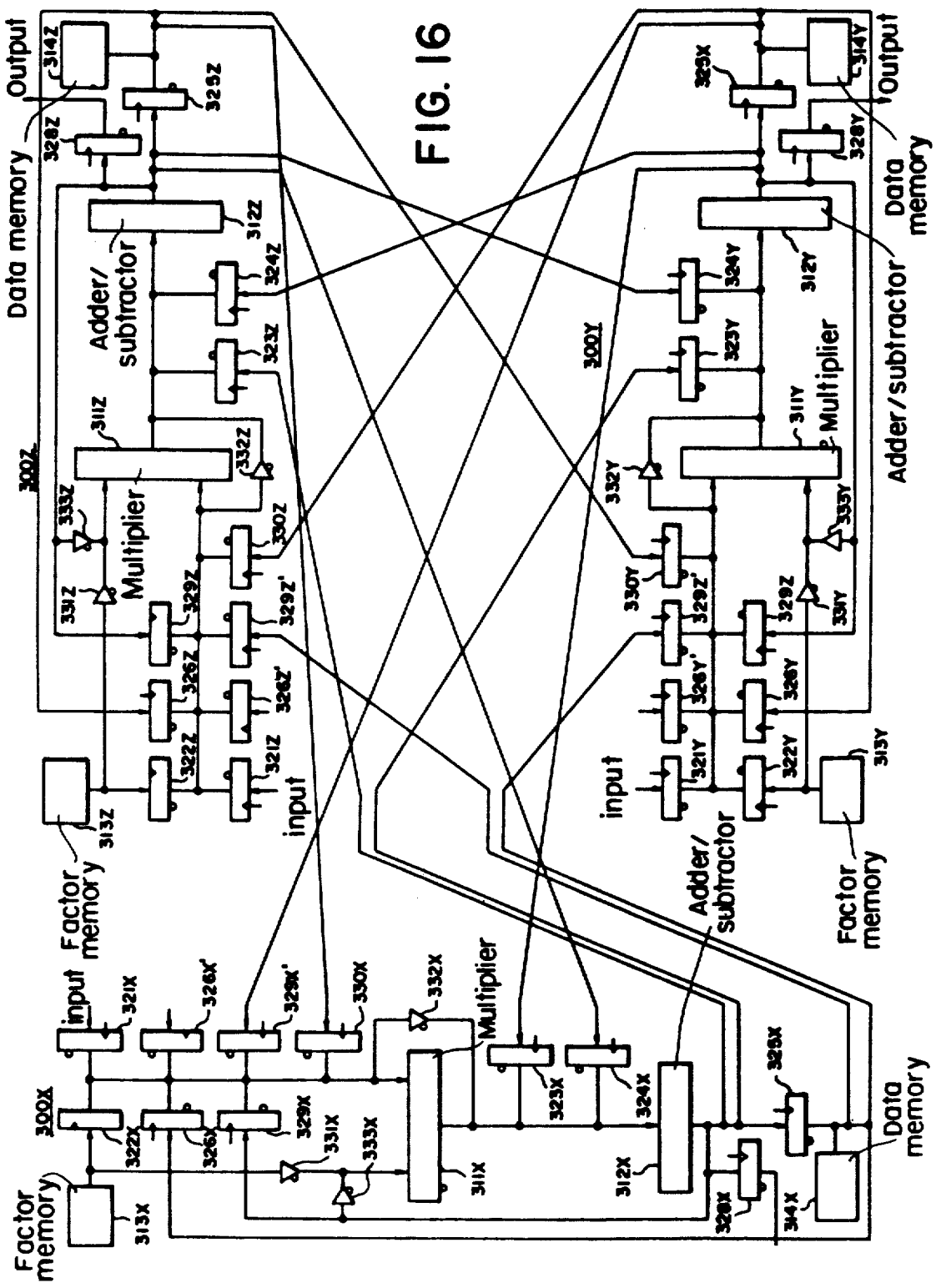
FIG. 16 is a block diagram illustrating an embodiment of the configuration in a case where the data processor of FIG. 1 is applied to the calculation of a 3-dimensional address.

FIG. 16 is a schematic circuit diagram showing the connection of the PVP 3B to calculate a 3-dimensional address in which the address generation section 300 is provided with an address generation section 30DZ for generating a z-directional address in addition to the configuration of FIG. 9.

Since these address generation sections 30DX, 30DY, and 30DZ related to the X, Y, and Z directions, respectively each have the completely identical structure, the same reference numerals are assigned to the components of the address generation sections 30DX, 30DY, and 30DZ associated with those of FIG. 9 together with the suffix letters X, Y and Z, respectively.

The address generation section 30DX, 30DY, and 30DZ each are provided with the registers 326X', 329X, 329X', and 330X in addition to the configuration of FIG. 9.

As shown in this diagram, the address generation sections 30DX, 30DY, and 30DZ of the three directions are connected to each other, so that for an address generation in each direction, the results of the address generations in the other directions can be appropriately used.

In the case of this example, the outputs from the adder/subtractor units 312X, 312Y, and 312Z are supplied to registers so that one of the outputs related to a direction is supplied to the multiplier 311X of the address generation sections for the other two directions, and the outputs from the adder/subtractor units 312X, 312Y, and 312Z are temporarily stored in registers and then are further supplied to registers, so that the outputs are inputted to an adder/subtractor of the address generation sections related to the other two directions.

Naturally, the method for connecting the address generation sections 30DX, 30DY, and 30DZ is not restricted by this connection.

By using two units of the address generation sections having the configuration described above, an address generation suitable for the 3-dimensional processing can be achieved.

In this example, incidentally, for the PVP 3B, if the image to be inputted is represented with the address information in the X and Y directions, the 3-dimensional, positional information of the original object to be displayed as an image, namely, the depth information is stored in the Z memory (not shown). The depth information is obtained through a computation on assumption of $Z = Z(X, Y)$ and the values thereof are written beforehand via the TC 4 in the Z memory under control of the host computer.

As an example, a description will be given of processing in which an object is rotated in a 3-dimensional space.

Figure 17:
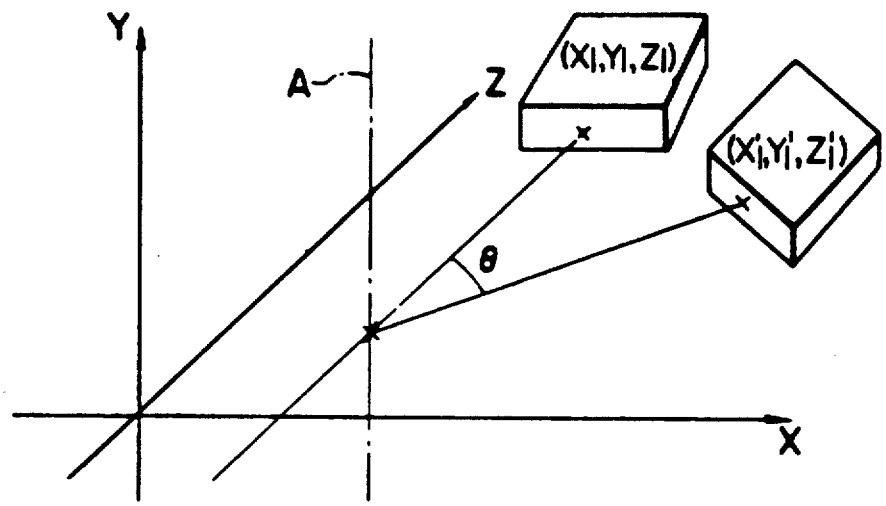
FIG. 17 is a schematic diagram for explaining an example of the 3-dimensional processing.

For example, as shown in FIG. 17, let us consider that a parallelopiped in the 3-dimensional space is rotated by $\theta$ about a line A parallel to the y axis. In this case, an arbitrary point $(X_1, Y_1, Z_1)$ on the parallelpiped is moved to a position $(X_i, Y_i, Z_i)$. The values of X, Y, and Z can be obtained as follows.

$$X_i = X_l + Z_l \sin \theta$$

$$Y_i = Y_l \qquad (a)$$

$$Z_i = Z_l \cos \theta$$

Consequently, when $X_l$ and $Y_l$ from the first address generation section and $Z_l$ from the Z memory are supplied to the second address generation section, $X_i$, $Y_i$, and $Z_i$ can be obtained from the second address generation section, namely, a having undergone the rotation is stored in the VIMOUT memory 2B.

Figures 18A, 18B, 18C:
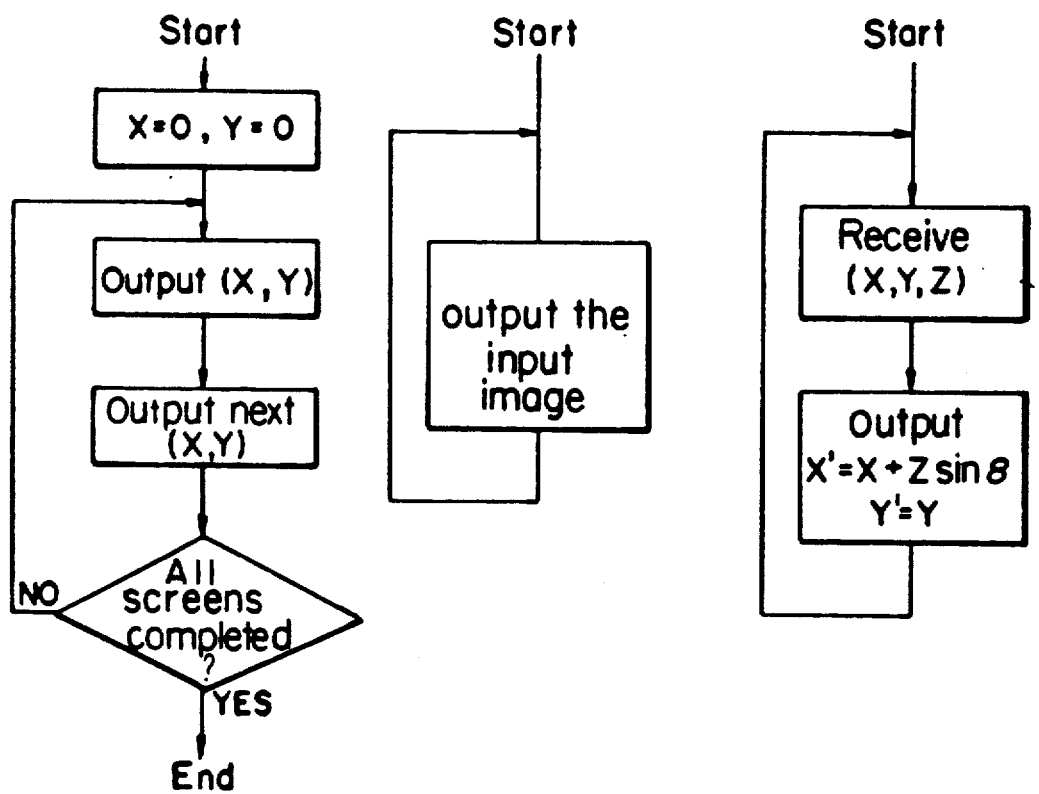
FIGS. 18A, 18B, and 18C are diagrams showing a flowchart for explaining the 3-dimensional processing in the configuration of FIG. 16.

FIG. 18A is a flowchart of a program executed in the first address generation section, FIG. 18B is a flowchart of a program executed in the PIP 3A, and FIG. 18C is a flowchart of a program executed in the second address generation section.

That is, among the addresses of three directions from the first address generate section, the addresses of the X and Y directions are supplied to the VIMIN 2A beginning from "0", and the input image data for a screen is entirely read and is inputted to the PIP 3A.

The image data supplied to the PIP 3A is delivered to the VIMOUT 2B.

On the other hand, the addresses of the X and Y directions from the first address generation section are supplied as inputs to the arithmetic and generation sections 300X and 300Y for the X and Y directions, respectively of the second address generation section; furthermore, the addresses are supplied to the Z memory, which supplies the addresses of the Z direction based on $Z = Z(X, Y)$. The obtained addresses of the Z direction are supplied as inputs to the arithmetic and generation section 300Z for the Z direction.

On receiving the address information of the three directions, the second address generation section conducts the calculation (a) described above. Among the addresses of the three directions, the address $(X_i, Y_i)$ in the two directions $X_i$ and $Y_i$ are used to write the data of $(X_l, Y_l)$ in the VIMOUT 2B. As a result, when the data written in the VIMOUT 2B is sequentially read beginning from an address of $X = 0$ and $Y = 0$, an image rotated by $\theta$ in the 3-dimensional space as shown in FIG. 17 is displayed on the monitor screen.

In the example described above, the addresses of the VIMIN 2A and the VIMOUT 2B are read and written with respect to the same two directions, an image of an object viewed from another direction can be easily obtained by changing the directions of the 2-dimensional addresses such that the addresses of the memory 2A are read and written in the X and Y directions and the addresses of the memory 2B are manipulated in the X and Z directions.

In this invention, to generate a 2-directional address for an image having a 2-dimensional structure, data like 3-dimensional data is processed in the generation of the address by closely relating the data items in the respective directions, which enables an effective processing like a 3-dimensional processing, for example, to rotate an object in a 3-dimensional space.

In the image processing system described above, there exists a so-called neighborhood processing in which a plurality of image data items in the neighborhood of a pixel are utilized to process a pixel in image processing. A contour extraction is an example of the neighborhood processing. The methods for processing the contour extraction includes a method using a logic filter, which will be described herebelow.

According to this method, for example, each pixel data comprising eight bits is represented in the binary form, and the obtained data is subjected to an operation by use of a 3×3 logic filter, thereby extracting a contour of an image.

In this processing method, first, the data including $3 \times 3 = 9$ pixels is converted into binary data. That is, as shown in FIG. 19, the binary conversion is effected on eight pixels $a_1-a_3$, $b_1-b_3$ and $c_1-c_3$ around the pixel data $b_2$, thereby obtaining $a_1{}^*-a_3{}^*$, $b_1{}^*-b_3{}^*$, respectively.

The logical sum of the nine binary pixels is then obtained as follows.

$$A = a_1{}^* \; a_2{}^* \; a_3{}^*$$
$$B = b_1{}^* \; b_2{}^* \; b_3{}^*$$
$$C = c_1{}^* \; c_2{}^* \; c_3{}^*$$

The binary central value b is subtracted from the logical sum values A, B, and C as follows.

$$A B C - b_2{}^*$$

The result of this operation is outputted as a value of the central value $b_2$ of the ine pixels.

The processing for each pixel is effected through the overall screen to achieve the contour extraction.

In the contour extracting method described above, the logical sum of pixel data in the binary form comprising 0 or 1 is generated. For example, if the original figure is a rectangle as shown in FIG. 20, the region 401 indicated with the shade originally having the value 1 in the binary representation is slightly enlarged (by about one pixel), and the original region 401 of the value 1 is removed from the enlarged region, so that there remains the portion 402 indicated with the shade in FIG. 8. This region comprises the pixels enclosing the region the value of which has become to be 1 through the enlarging operation, thereby obtaining the contour.

The methods of the binary conversion include the P tile method, the mode method, the differential histogram method, and the discrimination analysis method. The binary conversion in this system is conducted by use of the threshold value determined according to one of these methods.

In a case where such a neighborhood processing is accomplished, the data of eight pixels around a pixel is required and hence there arises a problem of a method for inputting the pixel data to the processor.

According to one of the methods, as shown in FIG. 21, the delay circuits 403 and 404 each for delaying a period of a horizontal scanning are used to simultaneously extract for the current data DA the data $DL_1$ advanced with respect thereto by a horizontal scanning period and the data $DL_2$ delayed with respect thereto by a horizontal scanning period, so that the data of three pixels to be vertically arranged on the screen is to be processed at the same time. The data for the nine pixels is fetched, for example, into the register section disposed as an input stage of the processor, thereby accomplishing the processing.

However, in the case of the method for inputting data by use of the delay circuits as described above, the data processing is delayed for the delay time related to the delay circuits, which disables the realtime processing.

In addition, if the realtime processing is executed in this case, the following problem arises. That is, in a case of the neighborhood processing using a 3×3 logic filter as described above, for example, the data of nine pixels is necessary to obtain an output associated with a pixel. Consequently, the data transfer rate on the input side must be nine times the data transfer rate on the output side.

As a result, the realtime processing cannot be accomplished only by inputting the data to the processor.

A description will be given of a case where an example of the system according to the present invention is applied to the contour extraction described above.

Figure 22:
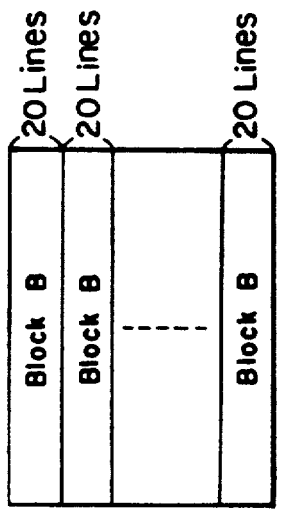
FIGS. 22-23 are schematic diagrams showing an example of a method for accomplishing an image processing in the image processing system of FIG. 1.

First, in this example, the overall screen data is split into blocks B each including 20 horizontal lines as shown in FIG. 22, and 20 processors are disposed so that the neighborhood processing of a line of each block B is executed by one of the processors.

In the case of the 3×3 processing described as the neighborhood processing, a processor calculates the result of a line by use of data related to three lines.

Since the image data is temporarily stored in the image memory, the input data to the processor for processing the data is read from the input image memory; however, in this example, the equal data transfer rates can be implemented on the input and output sides by appropriately setting the sequence for reading the pixels from the input image memory, by simultaneously transferring the pixel data to the processor requiring the data, and by using the register disposed in the input stage of each processor.

Figure 23:
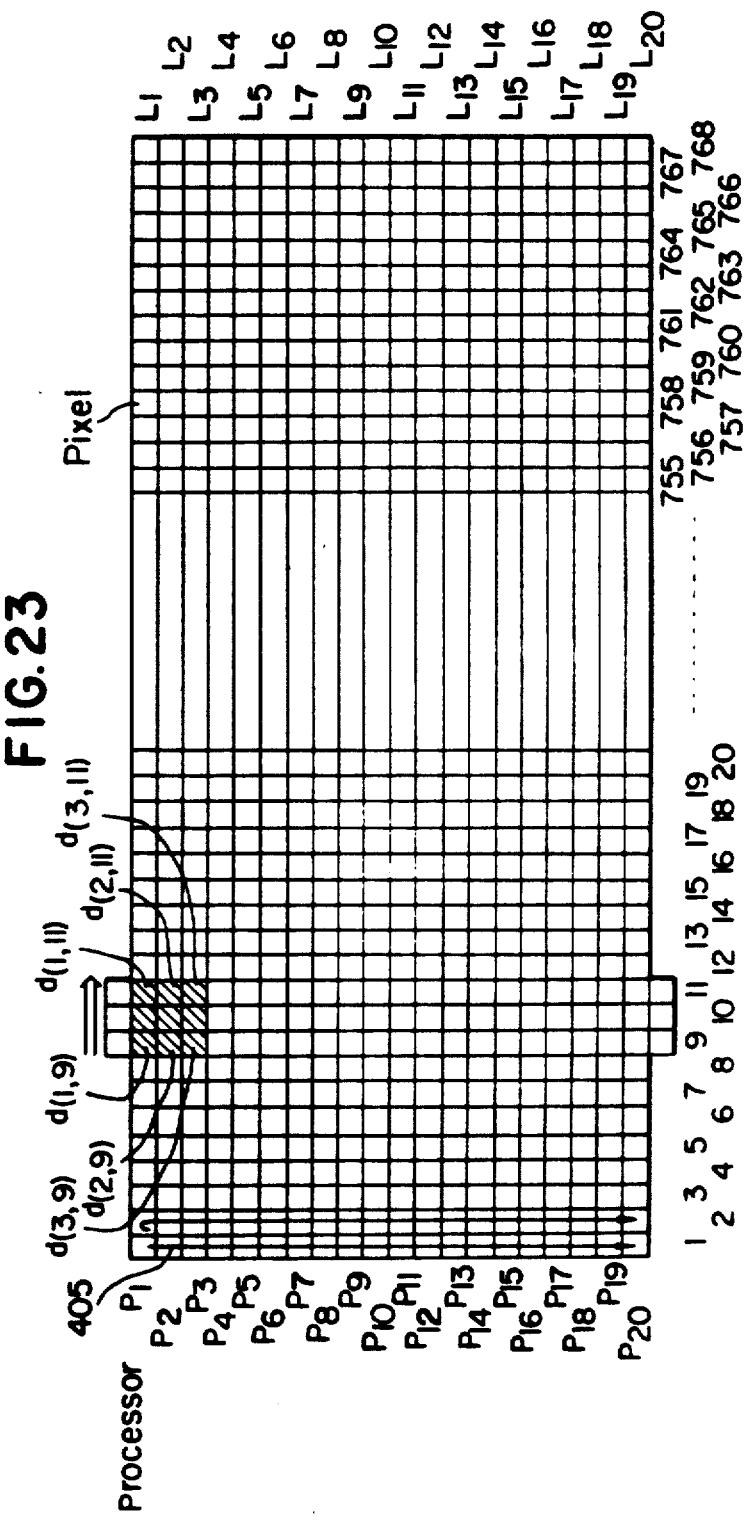

FIG. 23 is a diagram showing a block including 20 lines of the input image memory in which lines $L_1$, $L_2$, ... $L_{20}$ correspond to processors $P_1$, $P_2$, ... $P_{20}$, respectively.

On the other hand, the pixel data is read from the input image memory in the sequence, namely, in the vertical direction as marked by an arrow mark 405. In each block, therefore, the 20 pixels arranged in the vertical direction are read from the block and are consecutively transferred to the processor side.

In this operation, the transfer data is simultaneously fetched into the input register of the processor requiring the data.

For example, in the case of the contour extract processing using the $3 \times 3$ logic filter described above, let us consider a neighborhood processing of the tenth image data of each line by use of the positions ranging from the ninth position to the eleventh position.

Assume that after the pixel data d (i, 9) and d (i, 10) (i - 1, 2 . . . 20) of the ninth and tenth positions in the lines $L_1$-$L_{20}$ are transferred to the processors $P_1$-$P_{20}$, the pixel data d (i, 11) of the eleventh positions in the lines L—L are transferred.

Figure 24:
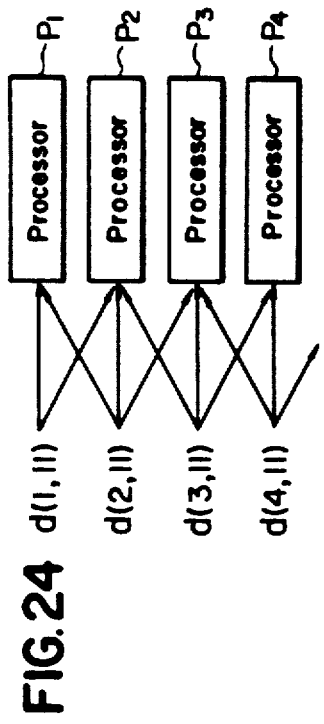
FIG. 24 is a conceptual diagram illustrating an example of the main portion of the system for achieving the image processing of FIGS. 22-23.

In this case, as shown in FIG. 24, the pixel data d (1, 11) of the eleventh position of the line $L_1$ is transferred to the processors $P_1$ and $P_2$, the pixel data d (2, 11) of the eleventh position of line $L_2$ is delivered to the processors $P_1$, $P_2$, and $P_3$, the pixel d (3, 11) of the eleventh position of the line $L_3$ is delivered to the processors $P_2$, $P_3$, and $P_4$, the pixel d (4, 11) of the eleventh position of the line $L_4$ is transmitted to the processors $P_3$, $P_4$, and $P_5$, and so on. In this fashion, the data is sent to the processors $P_1$-$P_{20}$ through the input registers, respectively.

The data stored in the input registers of the processors $P_1$-$P_{20}$ is combined with the ninth and tenth pixel data d (i, 9) and d (i, 10) in the lines $L_1$-$L_{20}$ so as to be processed as the data of the nine pixels necessary for calculating the output values of the tenth central pixel.

In this case, the data of six pixels among the data of nine pixels is also used as the pixel data to calculate the output value of the preceding ninth central pixel data.

Figure 25:
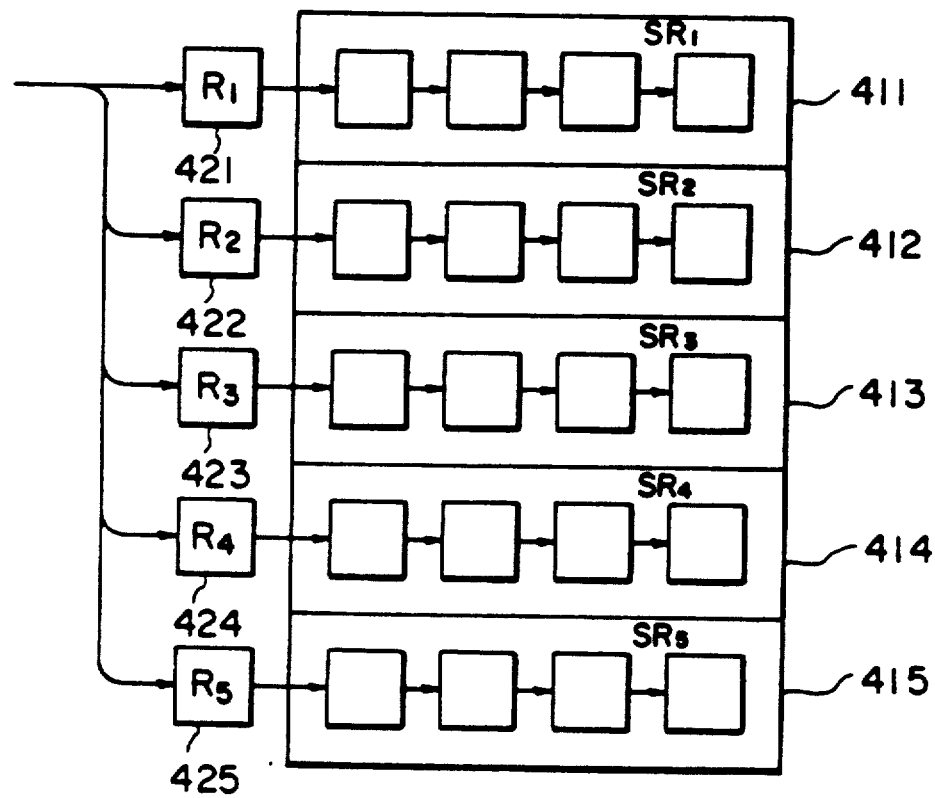
FIG. 25 is a block diagram depicting an example of an input register disposed in each processor of the system for achieving the image processing of FIGS. 22-23.

FIG. 25 shows the configuration of the input register of each processor. This example is not only applicable to the $3 \times 3$ logic filter, namely, this configuration has an expanded feature to enable the neighborhood processing by use of the data of up to $5 \times 5 = 25$ pixels.

That is, in this diagram, in the shift registers 411–415 disposed corresponding to the five horizontal lines, buffer registers 421–425 are included as the first stage. The input terminal for the input pixel data is configured to be commonly supplied to the buffer registers, and the timing to supply clocks to the registers are controlled, thereby fetching the necessary pixel data in the pertinent registers.

Since the case of this example is related to a processing of a $3 \times 3$ logic filter, the registers 424–425 and shift registers 414–415 are not used.

In a case where the $3 \times 3$ logic filter is used, when the pixel data is stored in three buffer registers 421–423, the system achieves an operation so that the pixel data is simultaneously transferred from these registers to the shift registers 411–413 for the first, second, and third lines.

When the data of nine pixels to be used in the processor is stored in the shift registers 411–413 related to the first, second, and third lines, the pixel data of the nine pixels is transferred to the arithmetic section of the processor so as to effect the contour extract processing described above.

The transfer of the data from the shift registers 411–413 to the arithmetic section of the processor is accomplished by use of instructions of a processing program stored in the control section of the processor. The processing associated with the pixel data of the nine pixels is to be completed by the time when the pixel data of nine pixels for the next data in the line to be processed by the processor is fetched.

A description will be given of the data fetch operation into an input register of each processor according to the example described above. For example, the eleventh pixel data d (2, 11) in the line $L_2$ is fetched into the buffer register 423 for the third line in the input register of the processor $P_1$, the buffer register 422 for the second line in the input register of the processor $P_2$, and the buffer register 421 for the first line in the input register of the processor $P_3$ at the same time.

Next, the eleventh pixel data d (3, 11) in the line $L_3$ is fetched into the buffer register 423 for the third line in the processor $P_2$, the buffer register 422 for the second line in the processor $P_3$, and the buffer register 421 for the first line in the processor $P_4$ at the same time.

In this case, when three eleventh data related to the lines is fetched in to registers, the three eighth data already processed is transferred to the second stage in the shift registers and is discarded, which enables to effect an efficient transfer operation.

In the processing described above, each processor naturally posseses a processing speed which allows the contour extract processing to be completed by the time when the data each, including three pixel data is transferred to the next stage in the shift registers 411–413.

Although the procedure to form blocks in a screen, the sequence for reading the blocks, and the method for fetching data into the input register vary depending on the processing, it is retained that the same data is simultaneously transferred to the processors requiring the data and that the equal data transfer rates are developed on the input and output sides.

Figure 26:
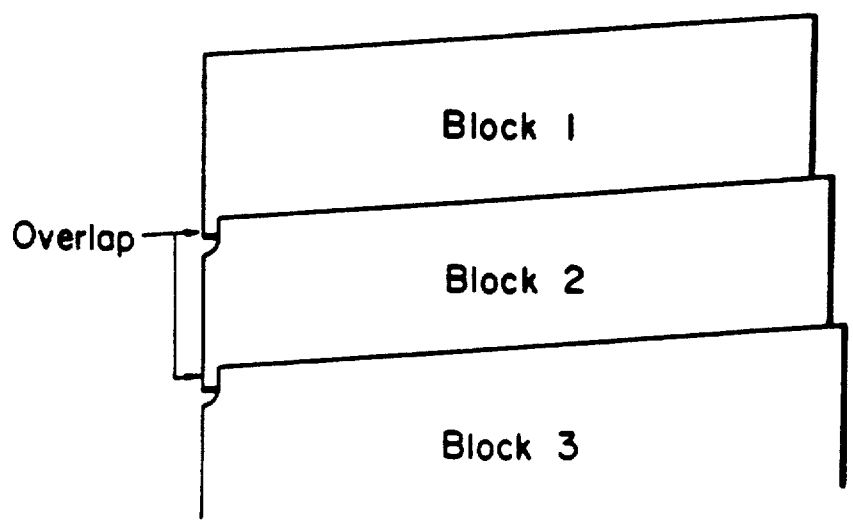
FIG. 26 is a schematic diagram showing a splitting method in a case where a split processing is executed on a screen in the image processing of FIGS. 22-23.

In the foregoing example where the screen is subdivided into blocks, the first and last lines of the 20 lines cannot be appropriately processed. (This is because the preceding line is missing for the first line and the succeeding line is missing for the last line). However, for example, in the block division, if an overlap of at least one line is provided for each block as shown in FIG. 26, the number of lines for which the appropriate processing is effected can be reduced.

In addition, the input register section need not be necessarily disposed in the processor, namely, the same operation can be achieved even if the input register section is located as the preceding stage of the input of the processor.

According to the present invention, in the neighborhood processing using the neighborhood data around a pixel, a plurality of processors are utilized and the data is simultaneously transferred to the processors requiring the data, which enables the same data transfer rate to be implemented on the input and output sides and hence to accomplish a realtime processing.

However, if a 1 K word memory is disposed as each factor memory in this system, the address is to be represented by use of ten bits and hence the configuration of the address generation and supply operation must be implemented for a total of 20 bits for two units of the factor memory. Consequently, the configuration of the address generation section in the control section 100 becomes complex and of a great size; furthermore, it is not easy to dispose two lines for supplying the address information.

In FIG. 9, two input registers are supplied with a data select signal from the control section 100, and the selected data is fed to the input registers of the multipliers 311X and 311Y constituting the arithmetic sections 300X and 300Y, respectively. The factor memory units 313X and 313Y are supplied with the address read from the control section 100, and the factor thus read is delivered to the multipliers 311X and 311Y, which are then driven according to a control signal from the control section 100 and the operation results are fed to the adder/subtractor units 312X and 312Y, respectively. Moreover, the data from the output reigsters of these adder/subtractor units 312X and 312Y is fed back thereto, and the adder/subtractor units are driven by the control signal from the control section 100 to deliver the operation result, which is in turn written in the output registers 328X and 328Y, respectively. The data from the output registers 328X and 328Y is fed to the output port according to the control signal from the control section 100.

Figures 27, 28:
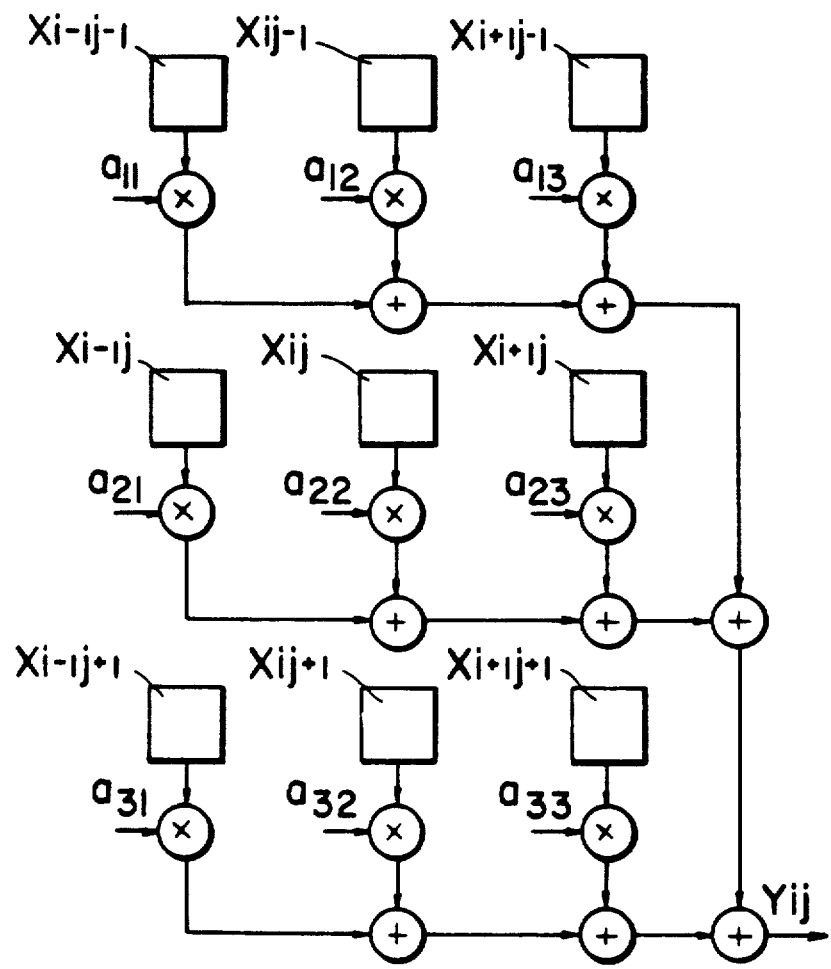
FIG. 27, is a conceptual block diagram for explaining the configuration of the data processor of FIG. 1.
FIG. 28 is a schematic diagram for explaining the memory contents in the configuration of FIG. 27.

In a case where, for example, a 3×3 spatial filter is configured in this system, the necessary function blocks are as shown in FIG. 27. In this diagram, $X_{ij}$ indicates a data item, $a_{ij}$ denotes a weighting factor (i = 1, 2, 3; j = 1, 2, 3), and $Y_{ij}$ is an operation result.

The result is expressed by the following difference equation.

$$Y_{ij} = \sum_{m=-1}^{+1} \sum_{n=-1}^{+1} a_{2+m, 2+m} X_{i-m, j-n}$$

To implement this operation in the unit processor section described above, the processing will be executed as follows.

(Step j)
  CM (A) {$a_{11}$} → MPY (A)
    $a_{11}$ is read from the factor memory 313X is delivered to the multiplier 311X.
  FRA {$x_{i-1, j-1}$} → MPY (A)
    $x_{i-1, j-1}$ is read from FRA and is transmitted to the multiplier 311X.
  CM (B) {$a_{13}$} → MPY (B)
    $a_{13}$ is read from the factor memory 313Y and is fed to the multiplier 311Y.
  FRA {$x_{i+1, j+1}$} → MPY (B)
    $x_{i+1, j+1}$ is read from the input register 321X and is delivered to the multiplier 311Y.
(Step j + 1)
  CM (A) {$a_{21}$} → MPY (A)
  FRA {$x_{i-1, j}$} → MPY (A)
  CM (B) {$a_{23}$} → MPY (B)
  FRA {$x_{i+1, j}$} → MPY (B)
  MPY (A) → ALU (A)
    Store $a_{11} \times x_{i-1, j-1}$ in the output register of the adder/subtractor 312X.
  MPY (B) → ALU (B)
    Store $a_{13} \times x_{i+1, j+1}$ in the output register of the adder/subtractor 312Y.
(Step j + 2)
  CM (A) {$a_{31}$} → MPY (A)
  FRA {$x_{i+1, j+1}$} → MPY (A)
  CM (B) {$a_{23}$} → MPY (B)
  FRA {$x_{i-1, j+1}$} → MPY (B)
  MPY (A) → ALU (B) + $R_A$
    Add the output from the output register of the adders/subtractor 312X and $a_{21} \times x_{i-1, j}$ and store the result in the output register of the adder/subtracter 312X.
  MPY (B) → ALU (B) + $R_B$
    Add the output from the output register of the adder/subtractor 312Y and a X $x_{i+1, j+1}$ and store the result in the output register of the adder/subtractor 312Y.
(Step j + 3)
  CM (A) $a_{12}$ → MPY (A)
  FRA {$x_{1-1, j}$} → MPY (A)
  CM (B) {$a_{32}$} → MPY (B)
  FRA {$x_{i, j+1}$} → MPY (B)
  MPY (A) → ALU (A) + $R_A$
  MPY (B) → ALU (B) + $R_B$
(Step j +4)
  CM (A) {$a_{22}$} → MPY (A)
  FRA {$x_{ij}$} → MPY (A)
  MPY (A) → ALU (A) + $R_A$
  MPY (B) → ALU (B) + $R_B$
(Step j + 6)
  $R_B$ + ALU (A) + $R_A$
    Add the content of the output register of the adder/subtractor 312Y and the content of the output register of the adder/subtractor 312X.
(Step j + 7)
  $R_A$ → Output port The 3×3 spatial filter is implemented as described above.

In this case, the factors $a_{11}$ and $a_{13}$ of the step j, the factors $a_{21}$ and $a_{23}$ of the step j+1, and the factors $a_{31}$ and $a_{33}$ of the step j+3 are obtained from the factor memory units 313X and 313Y, which is required at the same point of time. To this end, these factors are written at the pertinent addresses of the respective memory units 313X and 313Y, so that address 0, address 1, address 2, address 3, and address 4 are read in the steps, j, j+1, j+2, j+3, and j+4, respectively, thereby extracting these factors in the similar fashion to the ordinary manner.

Consequently, in the system described above, even when the common read address is supplied from the control section 100 to the memory 313X and 313Y, the factors are similarly extracted from the memory 313X and 313Y in the same way as for the ordinary case, which allows to generate the same address in the control section 100 and to read data from each memory 313X, 313Y through a signal supply line for a memory, for example, for ten bits.

The system described above is more effective as the number of the memory units is increased. For example, if the number is n, the number of the address generating sections as well as the signal supply lines can be reduced to 1/n time that required in the conventional system.

According to the present invention, since each factor memory can be read by use of the common address, the read address generation in the control section is facilitated; furthermore, the number of the signal supply lines is reduced, which enables to simplify the configuration of the system.

A case in which the system of the present invention is applied to the video signal processing has been described; however, also in a case for digitally processing the audio signal and other signals, the signals are stored in a memory for each unit period of time and the digital processing is accomplished on the signal in the unit of the period of time, that is, the present invention is applicable to the information signal processing for other than these video signals.

What is claimed is:

1. An information processing system including an input/output section, a memory section, and a data processing section for communicating data in block units via the memory section between the input/output section and the data processing section, characterized in that
    the flow of the data in the information processing system between the input/output section, the memory section, and the data processing section is controlled by the data processing section which includes means for producing an internal timing signal from each said block of data for synchronizing internal processing of said data processing section and a processing end signal indicating completion of the data processing of the block unit of data in said data processing section and means for supplying the processing end signal to the input/output section; and said input/output section includes means for producing a processing start timing signal synchronized with a block start signal derived from each block unit of the data by producing the processing start timing signal in response to the processing end signal and said block start signal.

2. An information processing system according to claim 1, wherein said memory section comprises a plurality of memory sheets where each of said memory sheets can store at least one of said block units and said input/output section generates a mode signal to switch read or write control of each of said memory sheets between the input/output section and the data processing section.

3. An information processing system according to claim 1, wherein said data processing section comprises a plurality of processors for performing parallel and/or pipeline processing of the data.

4. An information processing system according to claim 1, wherein said data is a video signal and said block units are fields or frames of said video signal.

5. An information processing system according to claim 4, wherein said input/output section further comprises:

an analog to digital converter for converting said video signal into digital signals for processing by said data processing section; and a digital to analog converter for converting digital signals produced by said data processing section into analog signals for storage on videotape or for display.

* * * * *